United States Patent [19]
Takasawa et al.

[11] Patent Number: 5,609,427
[45] Date of Patent: Mar. 11, 1997

[54] KERNING METHOD AND A TYPOGRAPHIC APPARATUS UTILIZING SAME

[75] Inventors: Toru Takasawa; Yasuaki Araki, both of Tokyo, Japan

[73] Assignee: Dainippon Screen Mfg. Co., Ltd., Kyoto, Japan

[21] Appl. No.: 390,844

[22] Filed: Feb. 17, 1995

[30] Foreign Application Priority Data

Feb. 28, 1994 [JP] Japan .................................. 6-055218

[51] Int. Cl.$^6$ .............................................. B41J 19/32
[52] U.S. Cl. ............................................ 400/304; 400/61
[58] Field of Search ................................. 400/63, 61, 76, 400/304; 395/151

[56] References Cited

U.S. PATENT DOCUMENTS 5,501,538  3/1996  Sawada et al. ............................ 400/76

FOREIGN PATENT DOCUMENTS

| 50-65223 | 6/1975 | Japan | 400/304 |
| 2-243343 | 9/1990 | Japan | 400/304 |
| 3-244542 | 10/1991 | Japan | 400/304 |
| 3-269490 | 12/1991 | Japan | 400/304 |

*Primary Examiner*—Edgar S. Burr
*Assistant Examiner*—Steven S. Kelley
*Attorney, Agent, or Firm*—Lowe, Price, LeBlanc & Becker

[57] ABSTRACT

A kerning method for adjusting a position of an object character relative to an adjacent reference character already fixed in place, in arranging characters of a character string in a predetermined direction based on rectangular character frames (imaginary bodies) including character patterns (faces) therein. This method includes the steps of designating a minimum two-dimensional space (facing space) between the faces of the reference character and the object character; shifting a dot pattern of the object character dot by dot toward a dot pattern of the reference character, and determining, at respective shifts, pairs of dots (candidate point pairs) providing minimum facing space between the dot patterns in a direction perpendicular to a shifting direction; storing facing space information in the shifting direction and facing space information in the direction perpendicular thereto of the candidate point pairs when the imaginary bodies of the reference character and the object character contact each other; and moving the object character toward the reference character from a position in which the imaginary bodies contact each other.

10 Claims, 17 Drawing Sheets

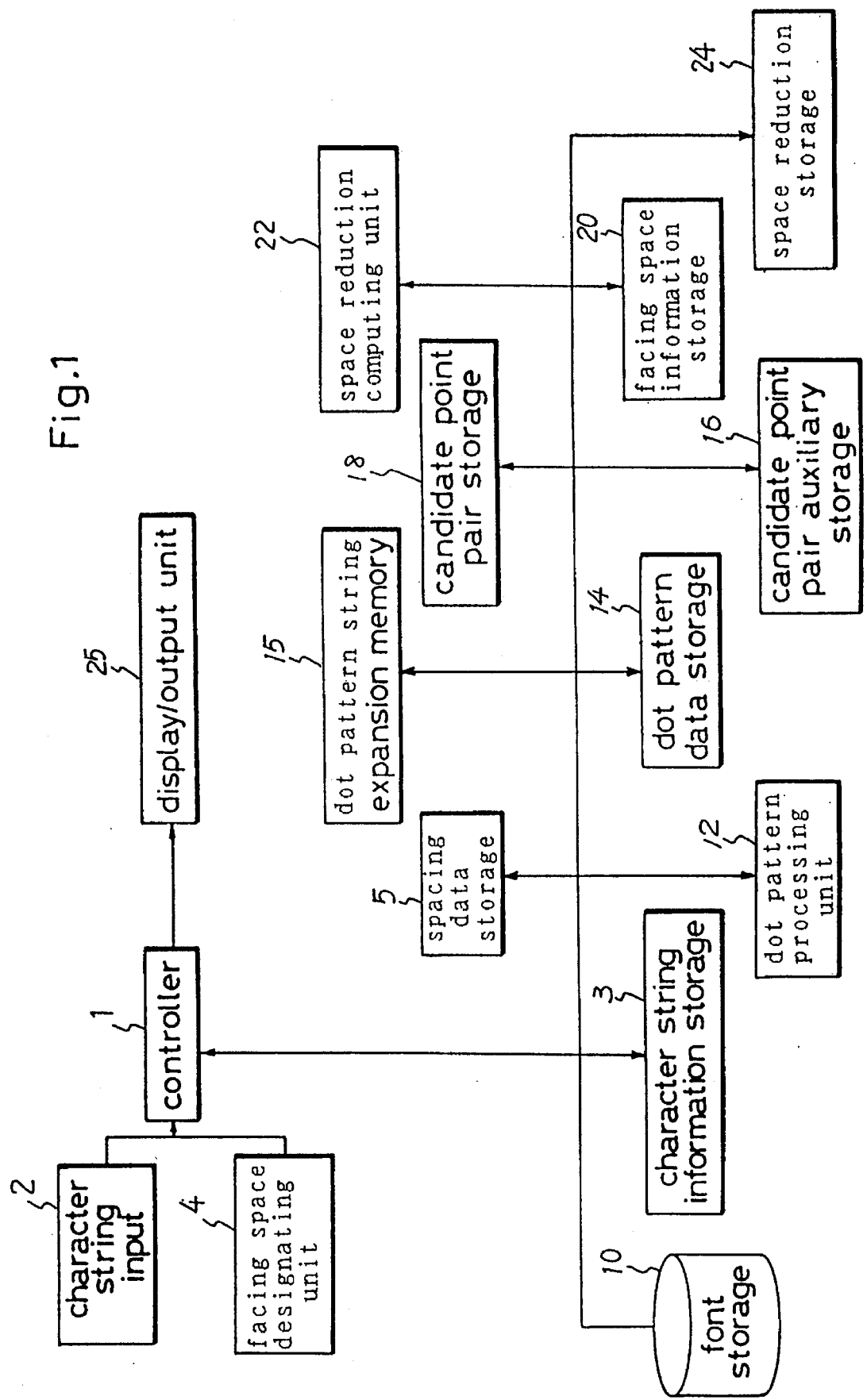

| font name |
| --- |
| character size |
| code of first character $C_1$ |
| code of second character $C_2$ |
| ⋮ |
| code of "n"th character $C_n$ |

```
        C1                              Ci+1              15
  9 19 29 39 - - - - - 99 | 109 119 129 - - - - - - - 199
  8  ,                  , | 108                          ,
  7  ,                  , | 107                          ,
  6  ,                  , | 106                          ,
  5  ,                  , | 105                          ,
  4  ,                  , | 104                          ,
  3  ,                  , | 103                          ,
  2 12                  , | 102                          ,
  1 11                  , | 101                          ,
  0 10 20 30 40 50 60 70 80 90 | 100 110 120 130 140 - - - - 190
``` initial state

| Fp | Ap | Bp |
|---|---|---|
| 10 | 0 | 0 |

16

Col.7

| Fp | Ap | Bp |
|---|---|---|
| 4 | 77 | 123 |

16

| | C1 | | |
|---|---|---|---|
| | Fp | Ap | Bp |
| | 4 | 77 | 123 |

18 initial state

| Fp | Ap | Bp |
|----|----|----|
| 10 | 0  | 0  |

Col. 7

| Fp | Ap | Bp  |
|----|----|-----|
| 4  | 77 | 133 |

Col. 6

| Fp | Ap | Bp  |
|----|----|-----|
| 3  | 66 | 123 |

| C₁ |  |  |
|----|----|-----|
| Fp | Ap | Bp  |
| 4  | 77 | 123 |

| C₁ |  |  |
|----|----|-----|
| Fp | Ap | Bp  |
| 4  | 77 | 123 |
| 3  | 66 | 123 | initial state

| Fp | Ap | Bp |
|---|---|---|
| 10 | 0 | 0 |

Col. 7

| Fp | Ap | Bp |
|---|---|---|
| 1 | 77 | 146 |

Col. 6

| Fp | Ap | Bp |
|---|---|---|
| 1 | 77 | 146 |

Col. 5

| Fp | Ap | Bp |
|---|---|---|
| 1 | 77 | 146 |

| $C_1$ | | |
|---|---|---|
| Fp | Ap | Bp |
| 4 | 77 | 123 |
| 3 | 66 | 123 |

| $C_1$ | | |
|---|---|---|
| Fp | Ap | Bp |
| 4 | 77 | 123 |
| 3 | 66 | 123 |
| 1 | 77 | 146 |

Fig. 17

| C1 | | |
|---|---|---|
| Fp | Ap | Bp |
| 4 | 77 | 123 |
| 3 | 66 | 123 |
| 1 | 77 | 146 |
| 0 | 66 | 146 |

| C | | |
|---|---|---|
| Fp | Ap | Bp |
| -- | -- | -- |

| Cn-1 | | |
|---|---|---|
| Fp | Ap | Bp |
| --- | --- | --- |

| C1 | |
|---|---|
| m | n |
| 40 | 30 |
| 50 | 20 |
| 60 | 0 |
| 70 | 0 |

| C | |
|---|---|
| m | n |
| --- | --- |

| Cn-1 | |
|---|---|
| m | n |
| --- | --- |

20

KERNING METHOD AND A TYPOGRAPHIC APPARATUS UTILIZING SAME

BACKGROUND OF THE INVENTION

1. Field of the Invention

The present invention relates to typefaces or fonts for typographic apparatus used in desktop publishing (DTP) and the like. More particularly, the invention relates to a kerning method for reducing facing space between characters and to a typographic apparatus utilizing this method.

2. Description of the Related Art

In arranging characters of a character string in a predetermined direction, an object character may be positionally adjusted or kerned relative to an adjacent reference character already fixed in place. An example of such kerning methods is disclosed in Japanese Patent Publication (Unexamined) No. 1975-65223. In this prior method, facing space between dot patterns of the faces of two characters is determined in a direction of character arrangement, and the characters are arranged so that the facing space produces a desired space between the faces thereof. In the methods disclosed in Japanese Patent Publications (Unexamined) Nos. 1990-243343 and 1991-269490, face outlines of two characters are scanned in a direction of character arrangement to compute space between the faces, and the characters are positioned to have a desired space between their faces.

In all of the above kerning methods, space between adjacent character faces is determined only in a direction of character arrangement. Where characters are successively arranged in a horizontal direction, for example, spacing is determined only in the horizontal direction. If an object character is placed relative to a reference character with a desired space between their faces, the two-dimensional space between the faces as seen obliquely or vertically, depending on character combinations, may be smaller than a desired space between the faces, or the faces could partly overlap each other. This impairs appearance.

In such kerning methods, after all, the operator must look at character strings on a CRT or the like and carry out fine adjustments empirically in order to adjust two-dimensional spacing including oblique and vertical directions between character faces. This process requires the operator to have a high level of skill and takes considerable time. For certain character combinations, amounts of space reduction may be determined in advance and stored in memory. However, such amounts have fixed-values and require a large storage capacity. Besides, the kerning process cannot be effected between different, size characters.

Japanese Patent Publication (Unexamined) No. 1991-244542, for example, discloses a kerning method in which characters are positioned based on two-dimensional space between their faces which is determined in oblique and vertical directions as well as a direction of character arrangement. According to this method, first of all, face dot patterns of two characters are spread by half a desired facing space. Then, the spread dot pattern of the object character is moved toward the dot pattern of the reference character. An amount of movement resulting in contact between the spread dot patterns is determined, and the object character before the spreading process is positioned by regarding the amount of movement as an amount of space reduction.

However, this method requires a time-consuming spreading process to compute an amount of movement (i.e. a space reduction amount) corresponding to a desired space between character faces. For varying the desired space between the character faces, the spreading process must be carried out all over again. Thus, although it is possible to arrange characters with desired two-dimensional spacing, this method has a disadvantage of slow processing and is unsuitable to fine adjustments of spacing between character faces involving a repetition of varied space settings.

SUMMARY OF THE INVENTION

The present invention has been made having regard to the state of the art noted above, and its object is to provide a high-speed kerning method, and a typographic apparatus utilizing this method, for enabling spacing between character faces to be adjusted to desired two-dimensional spacing, which method and apparatus are also suited to fine adjustments of character spacing involving a repetition of varied space settings.

The above object is fulfilled, according to the present invention, by a kerning method for adjusting a position of an object character relative to an adjacent reference character already fixed in place, in arranging characters of a character string in a predetermined direction based on rectangular character frames (imaginary bodies) including character patterns (faces) therein, the method comprising the steps of:

(a) designating a minimum two-dimensional space (facing space) between the faces of the reference character and the object character;

(b) shifting a dot pattern of the object character dot by dot toward a dot pattern of the reference character, and determining, at respective shifts, pairs of dots (candidate point pairs) providing minimum facing space between the dot patterns in a direction perpendicular to a shifting direction;

(c) storing facing space information in the shifting direction and facing space information in the direction perpendicular thereto of the candidate point pairs when the imaginary bodies of the reference character and the object character contact each other;

(d) moving the object character toward the reference character from a position in which the imaginary bodies contact each other, based on the facing space information in the shifting direction and the facing space information in the direction perpendicular thereto of the candidate point pairs and the facing space designated, and computing space reductions for the respective candidate point pairs until the facing space between the candidate point pairs agrees with the facing space designated;

(e) determining a space reduction providing a minimum facing space among the space reductions computed; and (f) positioning the object character relative to the reference character with the minimum facing space therebetween.

According to this method, facing space information in the shifting direction and facing space information in the direction perpendicular thereto of two characters with the imaginary bodies thereof contacting each other are stored in relation to the respective candidate point pairs selected. These two types of facing space information enable computation of a two-dimensional space between the faces of the characters kerned from the state in which the imaginary bodies contact each other. Thus, based on a designated two-dimensional space between the faces and the two types of facing space information, necessary space reductions are computed for the respective candidate point pairs to arrange the two characters with the designated space between the faces. The object character is positioned relative to the reference character with a minimum facing space reduction among the space reductions computed. This realizes a character arrangement with designated spacing without an overlap between the faces. When varying the space between the faces, a space reduction amount is computed from the two types of facing space information already stored and a newly designated space between the faces, without selecting candidate point pairs all over gain.

Thus, the dot pattern of the object character is shifted toward that of the reference character, only one pair of dots providing a minimum facing space between the dot patterns is selected at each shift as a candidate point pair, and one candidate point pair providing a designated space between the faces is determined among a plurality of candidate point pairs selected. This method processes a reduced number of dot pairs, and carries out a kerning process at a correspondingly faster rate. Further, the facing space information on the candidate point pairs selected is stored, which is combined with a designated space between the faces to enable computation of a space reduction amount to arrange the characters with the designated facing space. When a new space between the faces is designated, a kerning amount may be computed without selecting candidate point pairs again. Consequently, a fast, practical kerning process is effected to adjust (or correct) character spacing.

In the method according to the present invention, it is preferred that, at step (b), a pair of dots having a minimum facing space therebetween are selected as a candidate point pair when dot pairs are aligned in a plurality of columns in the direction perpendicular to the shifting direction, at each shift of the dot pattern of the object character toward the dot pattern of the reference character.

Preferably, at step (b), a pair of dots having a minimum facing space between the dot patterns in the direction perpendicular to the shifting direction is determined at each shift of the dot pattern of the object character toward the dot pattern of the reference character, step (b) being completed by selecting, as a candidate point pair, a dot pair through which the dot patterns overlap each other after the shift.

In a normal kerning process, the facing space between two characters is not deleted to an extent of overlapping the faces. However, depending on shapes of character faces, the faces could overlap each other straight away without stages of mutual in-thrusting. Taking this possibility into account, the process may be terminated after determining an overlapping dot pair as a candidate point pair. This measure enables the kerning process to be applied to various combinations of characters.

Preferably, at step (b), a pair of dots are selected as a candidate point pair when a plurality of dot pairs having a minimum facing space are aligned in one column in the direction perpendicular to the shifting direction, at each shift of the dot pattern of the object character toward the dot pattern of the reference character.

A plurality of candidate point pairs selected at the same shift and having the same minimum facing space provide the same facing space information in the "shifting direction" and the same facing space information in the "direction perpendicular to the shifting direction", and result in the same relational expressions at a later step. Thus, any one pair of dots may be selected as a candidate point pair from among these dot pairs. This avoids selection of unnecessary candidate point pairs, and allows the subsequent process to be carried out efficiently.

It is further preferred that, at step (b), a candidate point pair is selected at a large shift only when this candidate point pair provides a smaller facing space than the facing space at a candidate point pair at a smaller shift.

As in a combination of reference character ":" and object character "–", for example, plural pairs of dots may be selected at different shifts as a plurality of candidate point pairs. In such a case, only a candidate point pair selected at a minimum number of shifts is stored. This avoids selection of unnecessary candidate point pairs, and allows the subsequent process to be carried out efficiently.

In a further aspect of the present invention, there is provided a typographic apparatus utilizing a kerning method for adjusting a position of an object character relative to an adjacent reference character already fixed in place, in arranging characters of a character string in a predetermined direction based on rectangular character frames (imaginary bodies) including character patterns (faces) therein, the apparatus comprising:

(a) a facing space designating unit for designating a minimum two-dimensional space (facing space) between the faces of the reference character and the object character;

(b) a dot pattern processing unit for converting the faces of the object character and the reference character into dot pattern data having a predetermined number of dots;

(c) a dot pattern data storage for storing the dot pattern data of the object character and the reference character;

(d) a dot pattern string expansion memory for storing the dot pattern data of the object character and the reference character stored in the dot pattern data storage;

(e) a candidate point pair computing unit for shifting the dot pattern of the object character dot by dot toward the dot pattern of the reference character stored in the dot pattern string expansion memory, and determining, at respective shifts, pairs of dots (candidate point pairs) providing minimum facing space between the dot patterns in a direction perpendicular to a shifting direction;

(f) a candidate point pair storage for storing the candidate point pairs computed by the candidate point pair computing unit;

(g) a facing space information storage for storing facing space information in the shifting direction and facing space information in the direction perpendicular thereto of the candidate point pairs when the imaginary bodies of the reference character and the object character contact each other;

(h) a space reduction computing unit for moving the object character toward the reference character from a position in which the imaginary bodies contact each other, based on the facing space information in the shifting direction and the facing space information in the direction perpendicular thereto of the candidate point pairs and the facing space designated, and computing space reductions for the respective candidate point pairs until the facing space between the candidate point pairs agrees with the facing space designated;

(i) a space reduction storage for storing a space reduction providing a minimum facing space among the space reductions computed; and (j) a position control unit for positioning the object character relative to the reference character with the minimum facing space in said space reduction storage.

With this apparatus, the operator first designates, through the facing space designating unit, a desired two-dimensional space (facing space) which is a minimum space between the faces of a reference character and an object character. The dot pattern processing unit converts the reference character and object character into dot pattern data having predetermined numbers of dots, and these data are stored in the dot pattern data storage. The respective dot pattern data of the reference character and object character are written to the dot pattern string expansion memory. The candidate point pair computing unit shifts the dot pattern of the object character stored in the dot pattern string expansion memory, dot by dot toward the dot pattern of the reference character, and selects, at each shift, a pair of dots providing a minimum facing space between the dot patterns in the direction perpendicular to the shifting direction. The candidate point pairs selected as above are stored in the candidate point pair storage. Space information in the shifting direction and facing space information in the direction perpendicular thereto of the two characters with the imaginary bodies thereof contacting each other are stored in the facing space information storage in relation to the respective candidate point pairs. The space reduction computing unit moves the object character toward the reference character from the position in which the imaginary bodies contact each other, based on the two types of facing space information of the candidate point pairs and the facing space designated, and computes space reductions for the respective candidate point pairs until the facing space between the candidate point pairs agrees with the facing space designated. The space reduction storage stores a space reduction providing a minimum facing space among the space reductions computed. The object character is positioned relative to the reference character with the (minimum) facing space reduction stored.

Thus, the dot pattern of the object character is shifted toward that of the reference character, only one pair of dots providing a minimum facing space between the dot patterns is selected at each shift as a candidate point pair, and one candidate point pair providing a designated space between the faces is determined among a plurality of candidate point pairs selected. This apparatus processes a reduced number of dot pairs, and carries out a kerning process at a correspondingly faster rate. Further, the facing space information on the candidate point pairs selected is stored in the facing space information storage, which is combined with a space between the faces designated through the facing space designating unit, to compute a space reduction amount to arrange the characters with the designated facing space. When a new space between the faces is designated, a space reduction amount may be computed without selecting candidate point pairs again. Consequently, a fast, practical kerning process is effected to adjust (or correct) character spacing.

In the apparatus according to the present invention, it is preferred that the candidate point pair computing unit is operable to select a pair of dots having a minimum facing space therebetween as a candidate point pair when dot pairs are aligned in a plurality of columns in the direction perpendicular to the shifting direction, at each shift of the dot pattern of the object character toward the dot pattern of the reference character.

Preferably, the candidate point pair computing unit is operable to determine a pair of dots having a minimum facing space between the dot patterns in the direction perpendicular to the shifting direction, at each shift of the dot pattern of the object character toward the dot pattern of the reference character, and to complete candidate point pair computation by selecting, as a candidate point pair, a dot pair with which the dot patterns overlap each other after the shift.

Further, the candidate point pair computing unit, preferably, is operable to select a pair of dots as a candidate point pair when a plurality of dot pairs having a minimum facing space are aligned in one column in the direction perpendicular to the shifting direction, at each shift of the dot pattern of the object character toward the dot pattern of the reference character.

It is also preferred that the candidate point pair computing unit is operable to select a candidate point pair at a large shift only when this candidate point pair provides a smaller facing space than the facing space at a candidate point pair at a smaller shift.

BRIEF DESCRIPTION OF THE DRAWINGS

For the purpose of illustrating the invention, there is shown in the drawings a form which is presently preferred, it being understood, however, that the invention is not limited to the precise arrangements and instrumentalities shown.

FIG. 1 is a block diagram showing an outline of a typographic apparatus according to the present invention;

FIG. 17 is a schematic view of a candidate point pair storage after all characters are processed;

FIG. 19 is a schematic view of a facing space information storage after all the characters are processed;

DETAILED DESCRIPTION OF THE PREFERRED EMBODIMENT

Figure 2A:
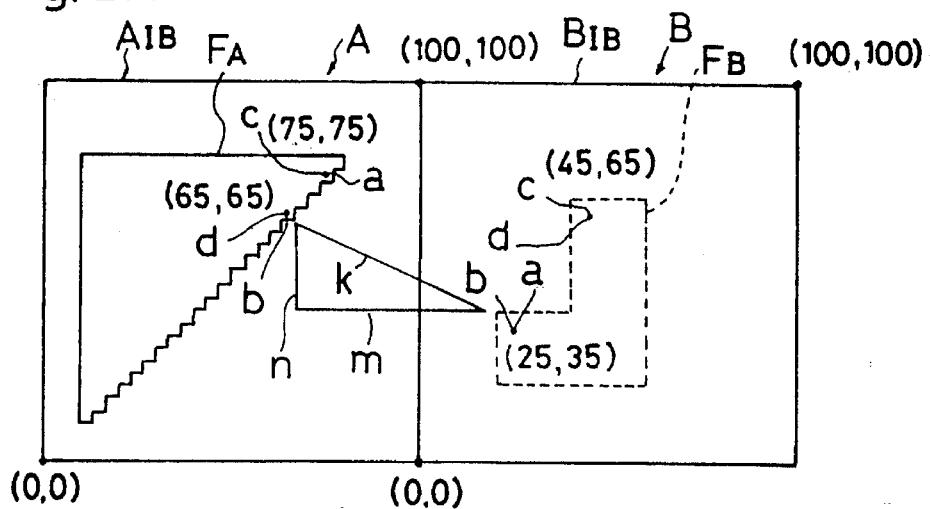
FIGS. 2A through 2C are explanatory views showing positional relationships between candidate point pairs in vector data.

FIG. 1 is a block diagram showing an outline of a typographic apparatus using a kerning method according to the present invention.

Numeral 1 in FIG.1 denotes a controller for executing the kerning method as a principal function thereof. The controller 1 includes a CPU and memories such as a ROM and a RAM not shown. A character string input 2 receives character strings from a medium storing character string data files (font names, character sizes, character codes, etc.) created on a word processor or the like. Character string data received are stored in a character string information storage 3 under control of the controller 1. The character string data stored in the character string information storage 3 are used as reference by the controller 1. A facing space designating unit 4 is used by the operator to input two-dimensional spaces between characters (character facing spaces), and these facing spaces are stored in a character facing space data storage 5. The facing space designating unit 4 comprises an input device such as a keyboard. The character facing spaces stored in the character facing space data storage 5 are used as reference by the controller 1.

The controller 1 reads from a font storage 10 vector font data corresponding to the character string data stored in the character string information storage 3. A dot pattern processing unit 12 forms vector data corresponding to a designated character size from the vector font data read, and converts the vector data into dot pattern data having predetermined numbers of dots to be stored in a dot pattern data storage 14. The controller 1 reads from the dot pattern data storage 14 dot pattern data for a character combination to be processed, and stores these data in a dot pattern string expansion memory 15. The vector font data provide character faces representing a character style and mathematically expressed by functions. The functions give closed letterform areas of black pixels corresponding to the character faces, and the remaining areas are filled with white pixels. The dot pattern data provide character faces in bit maps (e.g. formed of "1" of binary data).

A candidate point pair auxiliary storage 16 and a candidate point pair storage 18 are used to store information regarding pairs of dots (candidate point pairs) providing minimum facing spaces between dot patterns as described hereinafter. A dot pattern here represents a group of black pixels or dots in dot pattern data. A facing space information storage 20 stores facing space information on the candidate point pairs stored in the candidate point pair storage 18. The facing space information, as will be described in detail hereinafter, shows positional relationships between dots in candidate point pairs. A space reduction computing unit 22 derives kerning amounts or amounts of space reduction from this facing space information stored and the character facing spaces stored in the character facing space data storage 5. The space reduction amounts derived are stored in a space reduction storage 24, and added to the character string data stored in the character string information storage 3.

The controller 1 transmits the character string data stored in the character string information storage 3, to which the space reduction amounts have been added, to a display/output unit 25. Then, the data are displayed on a display device such as a CRT or outputted to an output device such as a printer. It is to be noted that the controller 1 has functions corresponding to the position control unit and the candidate point pair computing unit of the present invention.

<Overview of Processing>

To facilitate understanding, an outline of central processing will be described first with reference to FIGS. 2 through 4.

Figure 2B:
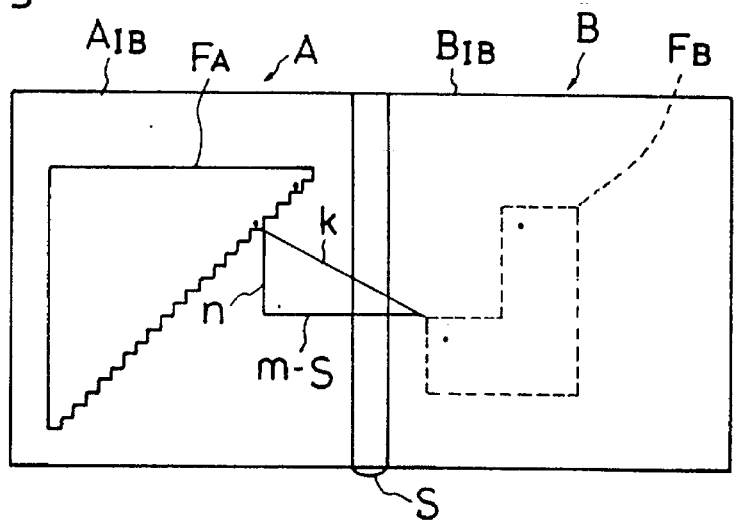

FIG. 2A is a schematic view showing a vector data expression of a reference character A serving as a reference for character arrangement, and an object character B placed horizontally with imaginary bodies of the two characters contacting each other. Each of the reference character A and object character B includes an imaginary body AIB or BIB having a character size of 100×100, and an inside face FA (region bound by a solid line) or FB (region bound by a dotted line). The arrangement in which the imaginary bodies contact each other is called "solid matter". In this state, one side of the imaginary body of object character B has zero space reduction (space reduction amount) from one side of the imaginary body of reference character A. The object character B is to be moved toward the reference character A, in the opposite direction to the direction of character arrangement.

(1) Conversion to Dot Pattern Data

Figure 3A:
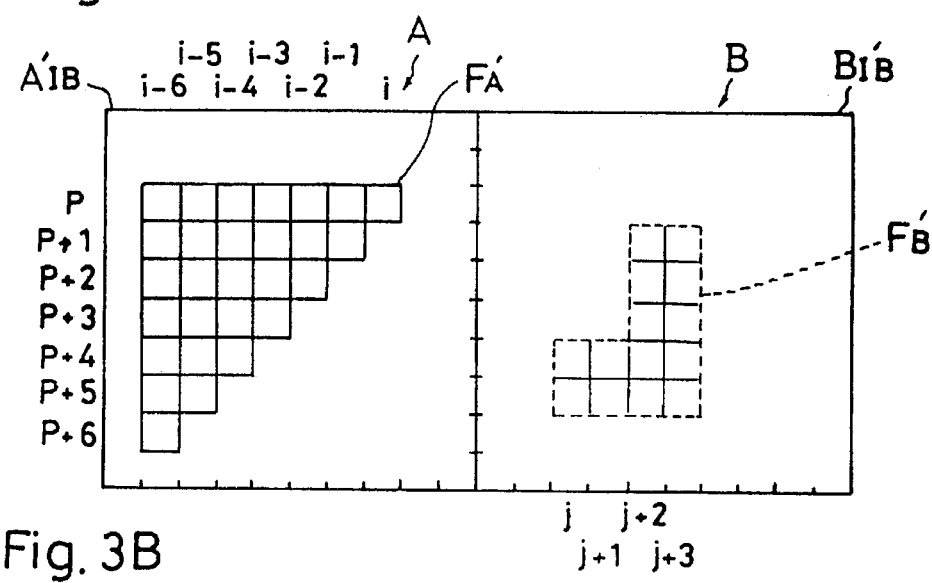
FIGS. 3A through 3C are explanatory views showing a method of selecting candidate point pairs in dot pattern data.
Figure 4A:
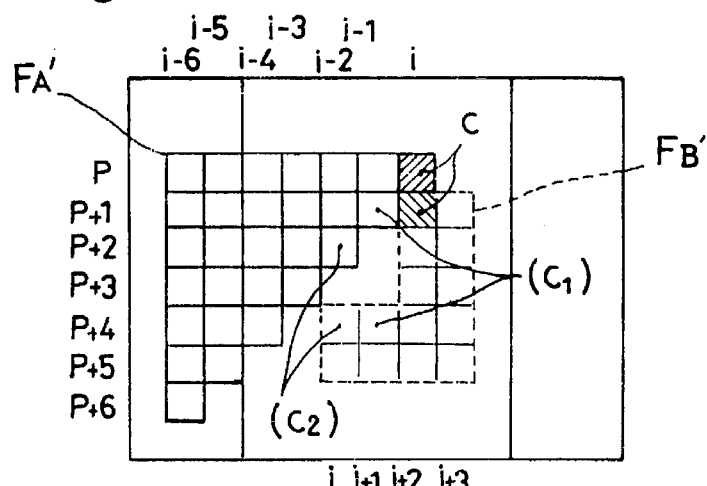
FIGS. 4A and 4B are explanatory views showing the method of selecting candidate point pairs in dot pattern data.

FIG. 3A shows the characters A and B expressed in 10×10 dot pattern data as converted from the vector data. Column numbers are assigned along the character arrangement, and row numbers in a direction perpendicular to the character arrangement, to the two characters A and B to identify dots in the dot patterns constituting the faces FA' and FB' thereof. Specifically, the face FA' of character A has columns "i" to "i−6" from right to left along the character arrangement, while the face FB' of character B has columns "j" to "j+3" from left to right. In the direction perpendicular to the character arrangement, both faces FA' and FB' have rows "p" to "p+6" from top to bottom. In this example, each dot in the dot patterns corresponds to size 10×10 of the vector data. Thus, the magnification ratio in this case is 1/10.

(2) Selection of Candidate Point Pairs

All pairs of dots (candidate point pairs) are selected as candidates, each of which provides a minimum space between the faces FA' and FB' of characters A and B expressed in the dot patterns. The candidate point pairs are stored in the candidate point pair storage.18.

Specifically, the dot pattern of object character B is shifted dot by dot from the "solid matter" position toward the dot pattern of reference character A. With each shift, all pairs of dots present in the direction perpendicular to the direction of character arrangement (i.e. aligned vertically) are selected from the faces FA' and FB' of characters A and B expressed in the dot patterns. One pair of dots providing a minimum facing space among a plurality of such dot pairs found in the same shift (corresponding to the number of shifts made) is regarded as the candidate point pair for that shift. The facing space between candidate points is a facing space expressed by the number of dots between the centers of two dots.

Figure 3B:
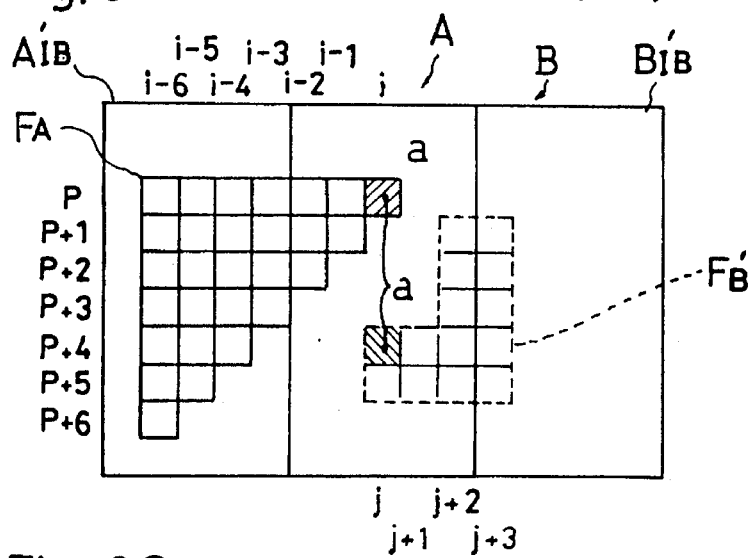

FIG. 3B shows a state resulting from shifts by five dots. In this state, only one pair of dots "a" (facing space: four dots) are vertically aligned, which are found in row "p+4" and column "j" of the face FB' and in row "p" and column "i" of the face FA'. This pair of dots are stored as candidate point pair "a" along with their facing space information in the candidate point pair storage 18.

Figure 3C:
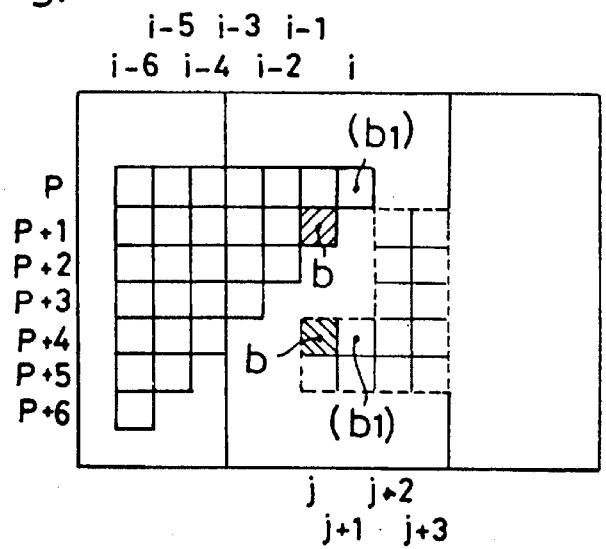

FIG. 3C shows a state resulting from a next shift made by one dot (i.e. a shift corresponding to a total of six dots). In this state, a pair of vertically aligned dots "b" (facing space: three dots) are found in row "p+4" and column "j" of the face FB' and in row "p+1" and column "i−1" of the face FA', and another pair of dots "b1" (facing space: four dots) in row "p+4" and column "j+1" of the face FB' and in row "p" and column "i" of the face FA'. In this case, the pair of dots "b1" are stored in the candidate point pair auxiliary storage 16, and the pair of dots "b" having the minimum facing space therebetween, i.e. a smaller facing space than the other pair, are stored as candidate point pair "b" in the candidate point pair storage 18.

In a state resulting from a further shift made by one dot (i.e. a shift corresponding to a total of seven dots; see FIG. 4A), a vertically aligned pair of dots "c" (facing space: one dot) are found in row "p+1" and column "j+2" of the face FB' and in row "p" and column "i" of the face FA', another pair of dots "c1" (facing space: three dots) in row "p+4" and column "j+1" of the face FB' and in row "p+1" and column "i−1" of the face FA'. A further pair of dots "c2" (facing space: two dots) in row "p+4" and column "j" of the face FB' and in row "p+2" and column "i−2" of the face FA'. In this case, the pair of dots "c" having the minimum facing spaces therebetween are stored as candidate point pair "c" in the candidate point pair storage 18.

Figure 4B:
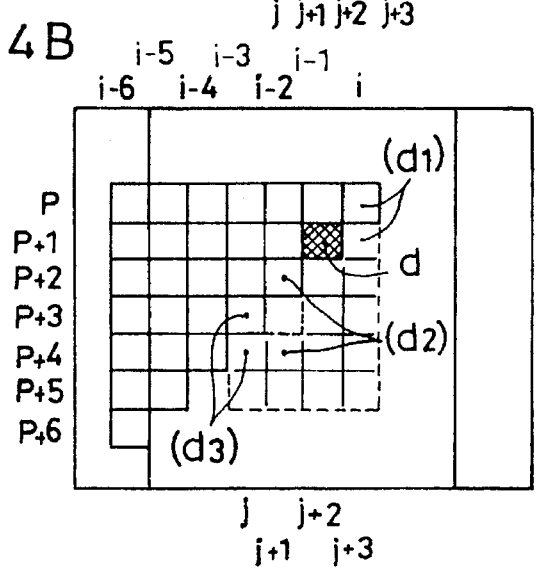

In a state shown in FIG. 4B resulting from a further shift by one dot (i.e. a shift corresponding to a total of eight dots), four pairs of dots "d", "d1", "d2" and "d3" are selected, and one pair of dots "d" (facing space: zero dot) are stored as candidate point pair "d" in the candidate point pair storage 18.

This candidate point pair selecting process is terminated when the character faces partly overlap each other. This is because the faces of adjacent characters are not kerned to an extent of mutual overlapping in a normal kerning process. Thus, in the above example, the selecting process is terminated with the shift of eight dots (FIG. 4B). With a pair of characters "E" and "F", for example, dot by dot shifting of an object character may cause the faces of the two characters to overlap each other straight away without stages of inthrusting as seen in FIGS. 3B and 3C. In such a case, the process is terminated by selecting an overlapping pair of dots as a candidate point pair.

As a result of the above process, the candidate point pair storage 18 stores the candidate point pairs "a" to "d" selected at the respective shifts.

Figure 5A:
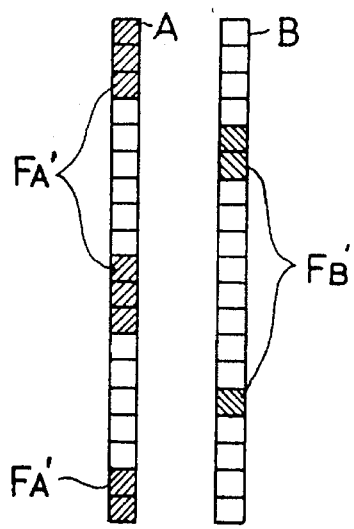
FIGS. 5A and 5B are explanatory views showing the method of selecting candidate point pairs in dot pattern data.
Figure 5B:
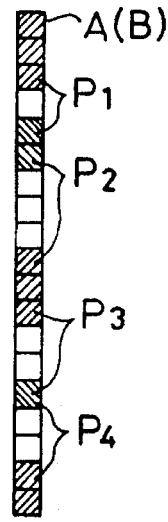

In the above example, only one opposed pair of dots are found in each aligned column. Where the characters have faces of complicated shapes, plural opposed pairs of dots may be found in each aligned column. Assume that, as shown in FIG. 5A, reference character A has a face FA' partly formed of dots lying in one of the columns, and object character B has a face FB' partly formed of dots lying in one of the columns. When the two columns overlap each other as shown in FIG. 5B, four opposed pairs of dots P1, P2, P3 and P4 are in alignment. In such a case, one dot pair P1 having the smallest facing space therebetween among the dot pairs P1–P4 may be selected as a candidate point pair to be stored in the candidate point pair storage 18. If plural pairs of dots have the smallest facing space, then any one of such pairs may be selected and stored as a candidate point pair. As described hereinafter, a space reduction amount for two characters is derived from relational expressions based on facing space information in the "shifting direction" and the "direction perpendicular to the shifting direction" of a candidate point pair selected when the imaginary bodies are in contact, and on a designated space between the faces. A plurality of candidate point pairs selected at the same shift and having the same minimum facing space invariably result in the same relational expressions.

A candidate point pair selected at a certain shift is disregarded if it has a larger facing space than a candidate point pair selected at a preceding shift.

(3) Computation of Space Reduction Amount

A computation is made for a space reduction amount necessary to equalize a two-dimensional minimum facing space to a designated space between the faces of reference character A and object character B.

In the "solid matter" state shown in FIG. 2A, facing space information "m" in the shifting direction and facing space information "n" in the direction perpendicular thereto are obtained as converted to spaces between face contours in the vector data, for the respective candidate point pairs stored in the candidate point pair storage 18. Assuming reference character A (Pax, Pay) and object character B (Pbx, Pby) as coordinates in the vector font data corresponding to center coordinates of the candidate point pairs, the facing space information "m" and facing space information "n" are expressed by the following equations:

$$m = (100 - Pax) + Pbx - 10 \tag{1}$$

$$n = |Pay - Pby| - 10 \tag{2}$$

In the above, n=0 when Pay=Pby. The value 100 represents a character size of the vector data, and the value 10 a size in the vector data corresponding to the size of one dot in the dot pattern data.

Assuming that the center coordinates [(Pax, Pay), (Pbx, Pby)] of dots in the vector data of the respective candidate point pairs are candidate point pair "a" [(75, 75), (25, 35)], candidate point pair "b"[(65, 65), (25, 35)], candidate point pair "c"φ[(75, 75), (45, 65)] and candidate point pair "d"φ [(65, 65), (45, 65)], the facing space information "m" in the shifting direction and the facing space information "n" in the direction perpendicular thereto of the respective candidate point pairs are derived from the above equation (1) and (2) as follows:

| candidate point pair | m | n |
|---|---|---|
| a | 40 | 30 |
| b | 50 | 20 |
| c | 60 | 0 |
| d | 70 | 0 |

Minimum space "k" between the faces in the vector data is derived from the following equation (see FIG. 2A):

$$k^2 = m^2 + n^2 \tag{3}$$

The object character B is shifted toward the reference character A from the "solid matter" state of zero facing space to a position by a space reduction S. With this space reduction S, the facing space information "m" in the shifting direction is expressed by (m−S) (see FIG. 2B). Therefore, the above equation (3) may be rewritten as follows:

$$k^2 = (m - S)^2 + n^2 \tag{4}$$

Figure 6A:
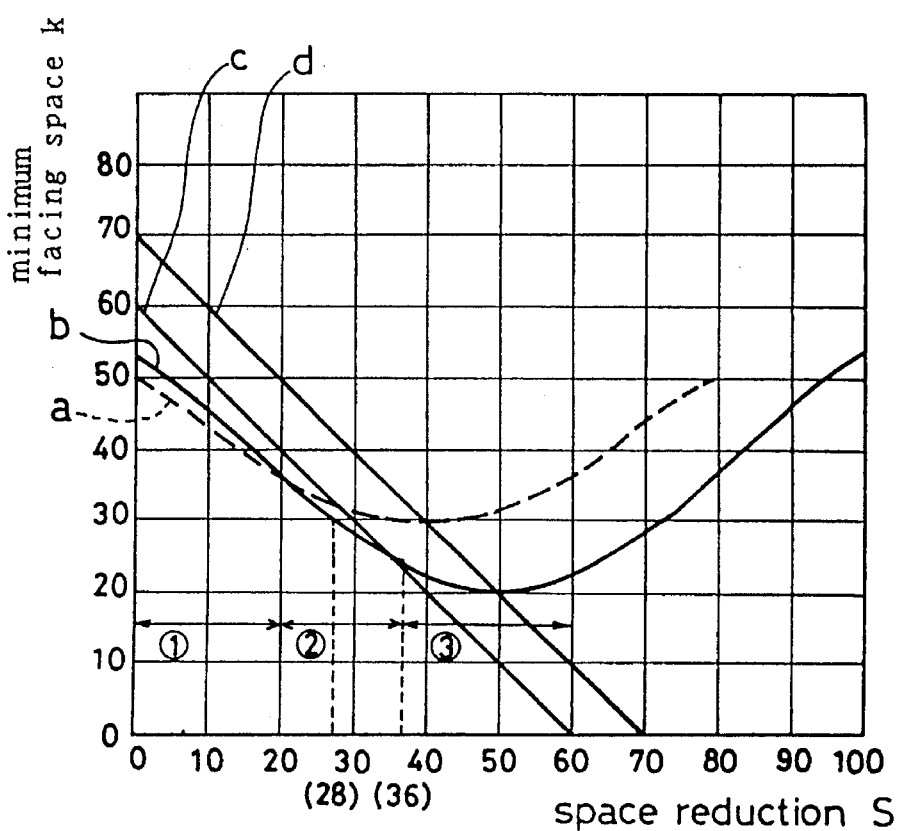
FIGS. 6A and 6B are graphs showing relationships between minimum facing space and space reduction.

FIG. 6A shows a graph of relationships between minimum facing space "k" and space reduction S for the candidate point pairs derived from the above relational expression.

In an actual kerning process, the minimum facing space "k" is a space between the faces of two characters, or a two-dimensional space $k_0$ between the faces desired and designated by the operator or designer. It is therefore necessary to determine space reduction S based on the designated space $k_0$ between the faces. Thus, space reduction S may be derived from equation (4) as follows:

$$S = |m \pm \sqrt{(k_0^2 - n^2)}\ | \qquad (5)$$

Assume, for example, that facing space $k_0=30$ is designated. Then, space reductions S to make the minimum spaces between the faces for the respective candidate point pairs agree with the facing space $k_0$ are derived from the facing space information "m" and "n" and equation (5) as follows:

| candidate point pair | space reduction S |
|---|---|
| a | 40 |
| b | 72, 28 |
| c | 90, 30 |
| d | 100, 40 |

Figure 2C:
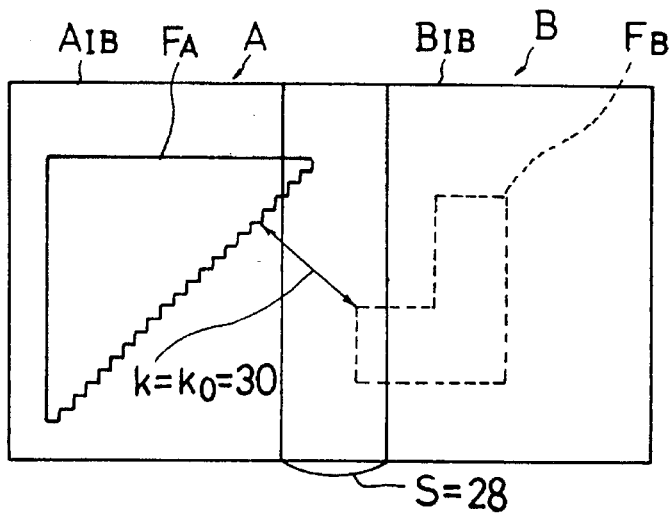

Of the space reductions S derived, the minimum space reduction Smin=28 for candidate point pair "b" may be used for positioning object character B relative to reference character A (see FIG. 2C).

The reason for arranging the characters based on this minimum space reduction Smin will be described with reference to FIG. 6A showing a graph of relationships between space reduction S and minimum facing space "k".

It will be seen from this graph that candidate point pair "a" provides a minimum facing space when space reduction S is from zero to 20 ($0 \leq S \leq 20$: space reduction range (1)). Candidate point pair "b" provides a minimum facing space when space reduction S is from 20 to 36 ($20 \leq S \leq 36$: space reduction range (2)). Further, candidate point pair "c" provides a minimum facing space when space reduction S is from 36 to 60 ($36 \leq S \leq 60$: space reduction range (3)). Both candidate point pairs "a" and "b" provide a minimum facing space when space reduction S is 20. Both candidate point pairs "b" and "c" provide a minimum facing space when space reduction S is 36.

Figure 6B:
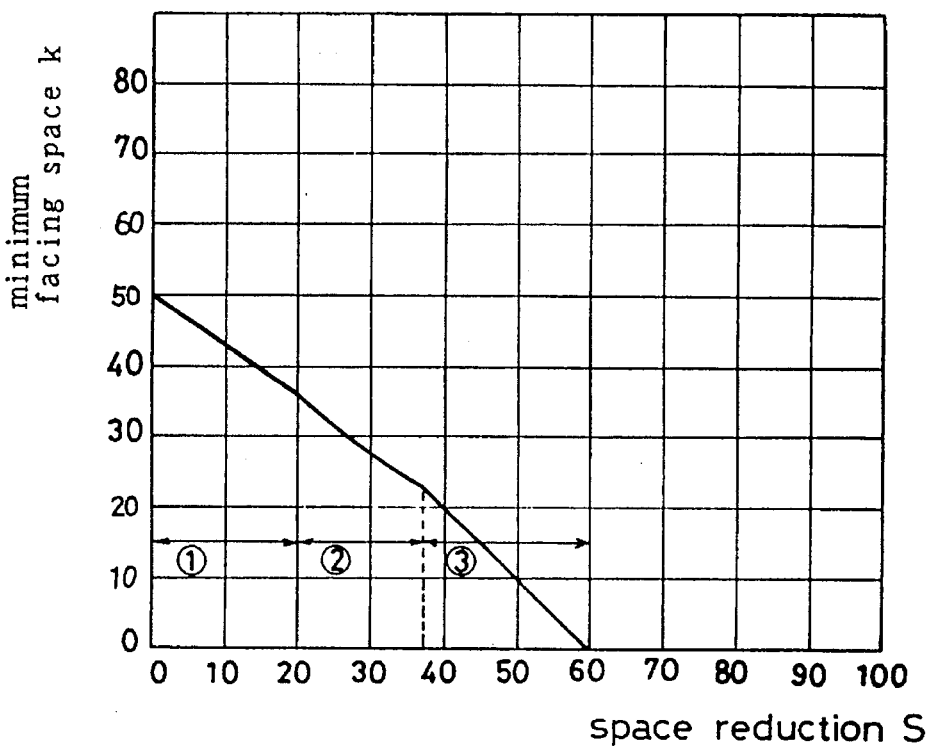

Consider the case of positioning object character B relative to reference character A to establish the two-dimensional minimum facing space between the faces $k_0=30$, based on a non-minimum space reduction S derived as above. Where, for example, space reduction S of "40" derived for candidate point pair "d" is employed, the minimum facing space "k" indeed provides "30" equal to the designated facing space $k_0$ for candidate point pair "d". However, the minimum facing space "k" between the candidate point pair "c" becomes "20" which is less than the designated facing space $k_0$. That is, if a non-minimum space reduction S is used for arranging the characters, part of the space between the faces becomes less than the designated facing space $k_0$. Thus, the minimum space reduction Smin among the space reductions S computed is used to determine a character arrangement. For the combination of reference character A and object character B, the relationship between designated facing space $k_0$ (minimum facing space "k") and space reduction S is as shown in FIG. 6B, combining characteristics of candidate point pairs "a", "b" and "c" providing the minimum facing spaces $k_0$ (minimum facing spaces "k") in the respective space reduction ranges (1)–(3) in FIG. 6A. It will be seen that this embodiment does not use candidate point pair "d" obtained when the facing space is zero, with the faces overlapping each other. However, depending on the face shapes of two characters, an overlapping candidate point pair or pairs may be required (e.g. where opposed portions of the two character faces run parallel).

The above is an outline of central processing in this embodiment. It will be appreciated from the foregoing description that the dot pattern of an object character is shifted dot by dot toward the dot pattern of a reference character, and facing space information "m" in the shifting direction and facing space information "n" in the direction perpendicular thereto are obtained for a candidate point pair selected at each shift with the imaginary bodies overlapping each other. The two types of facing space information enable computation of space reduction S to bring the two-dimensional space between the faces into agreement with designated facing space $k_0$. Once the candidate point pairs are selected and facing space information "m" and facing space information "n" are stored, the candidate point pair selection need not be repeated when facing space $k_0$ is designated again. This realizes an efficient operation for determining space reductions. In the above embodiment, the dot patterns corresponding to character faces are shifted dot by dot toward each other to select a pair of dots providing a minimum facing space at each shift as a candidate point pair. That is to say, a plurality of locations on two character faces likely to provide a minimum facing space when the characters are actually kerned are selected as candidate point pairs. One optimal candidate point pair is selected only from this group of candidate point pairs as described above. This process is therefore much faster than a process of determining a pair of dots providing a minimum facing space among all of the dots forming the contours of two characters.

Figure 7:
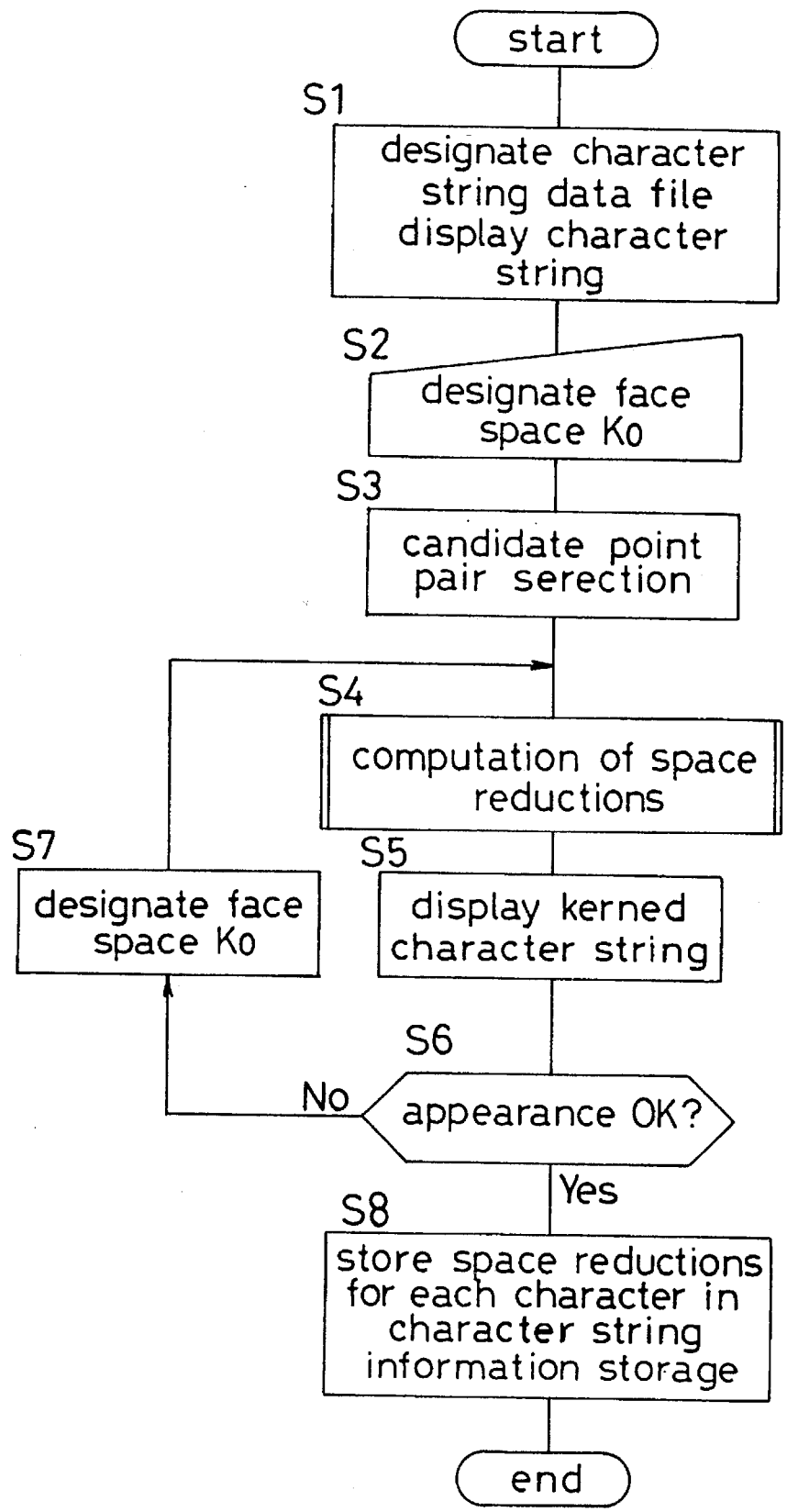
FIG. 7 is a flowchart of a kerning method according to the present invention.
Figure 8:
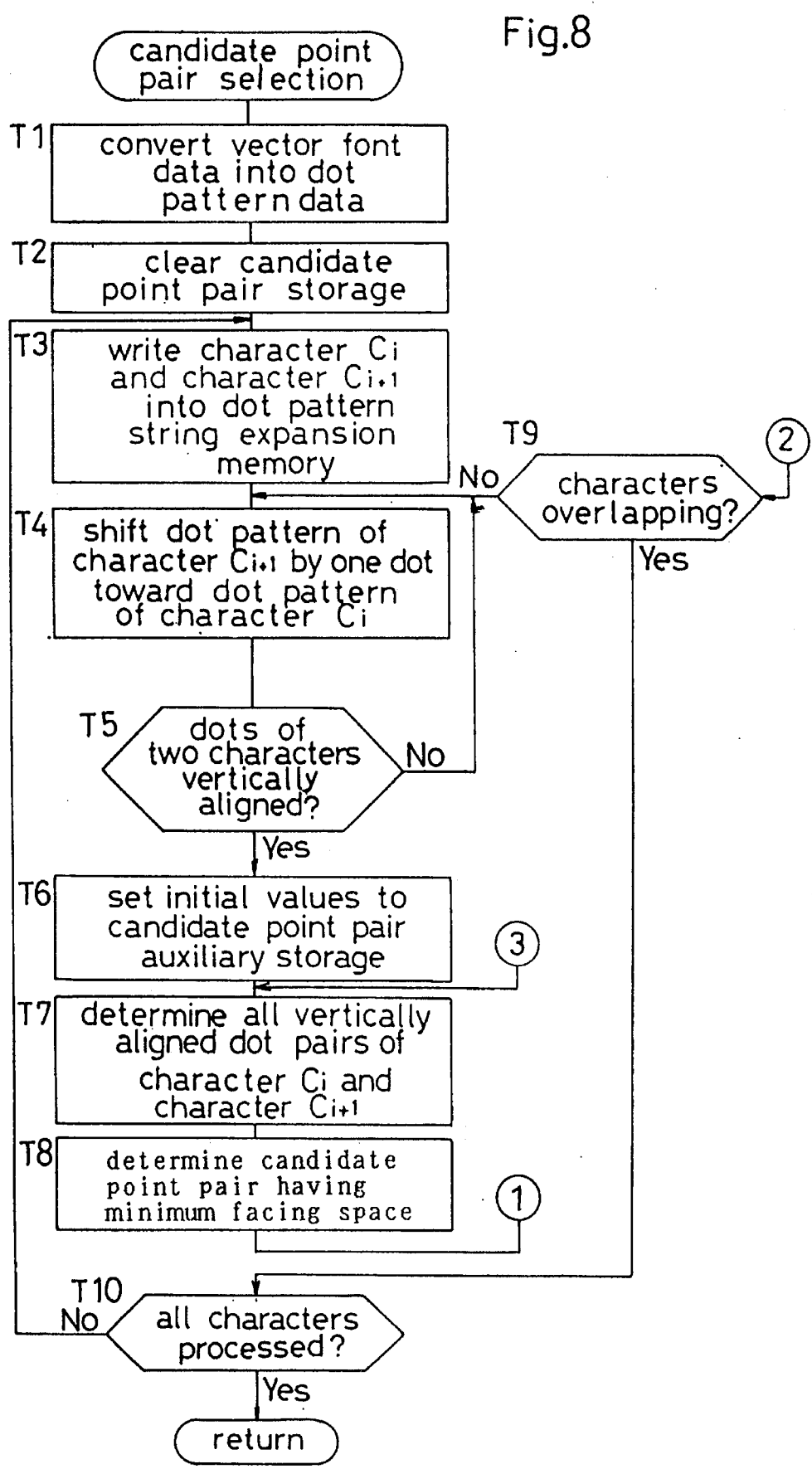
FIG. 8 is a flowchart of a candidate point pair selecting process.
Figure 9:
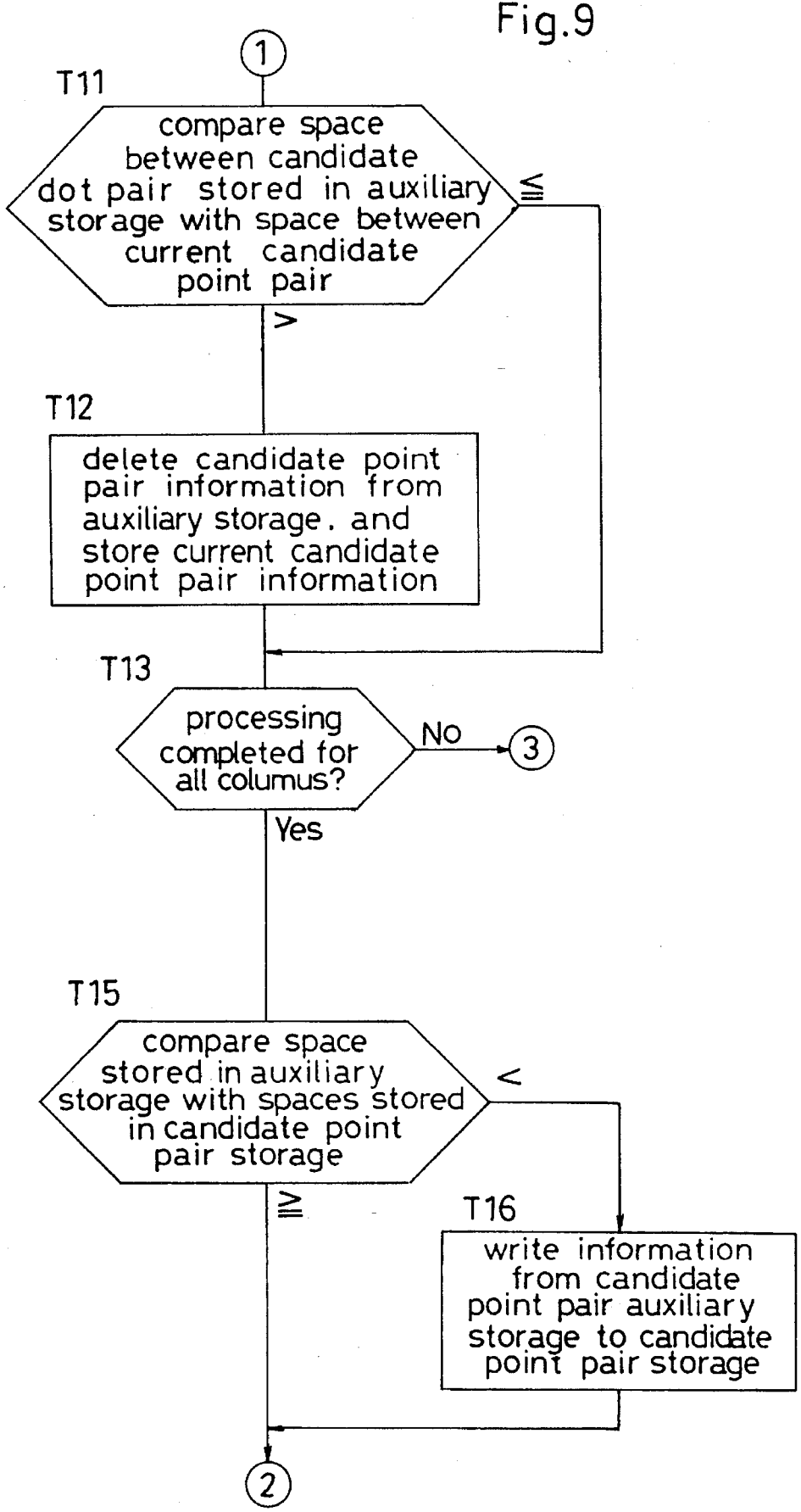
FIG. 9 is a flowchart of the candidate point pair selecting process.

Details of the foregoing process will be described next with reference to FIGS. 7 through 9. FIG. 7 is a flowchart of a main sequence of the kerning method. FIGS. 8 and 9 are flowcharts of the candidate point pair selecting process. The following description will be given on the assumption that the characters are arranged horizontally as in the description of the overview.

Reference is made to FIG. 7.

Figures 10, 11:
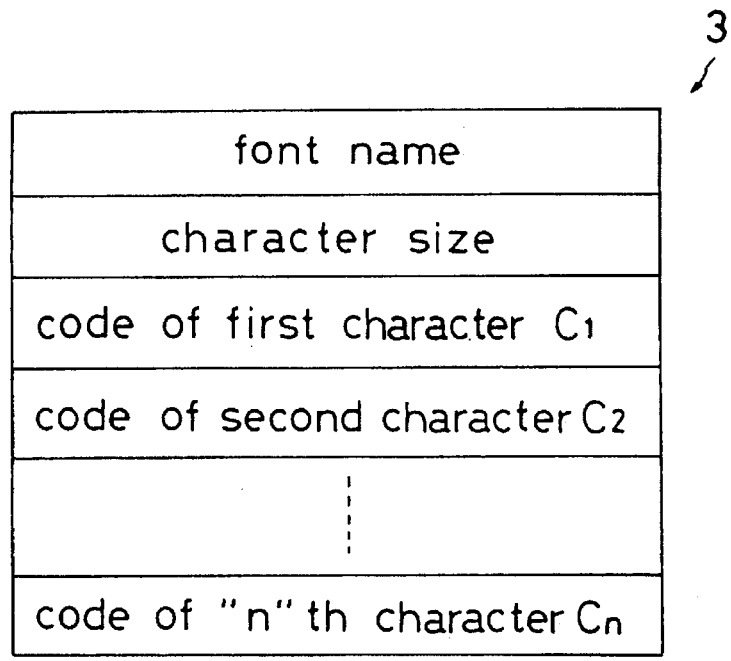
FIG. 10 is a schematic view of a character string information storage.
FIG. 11 is a schematic view of a dot pattern string expansion memory.

At step S1, the operator designates a character string data file to receive the kerning process. Character string data in this character string data file are inputted through the character string input 2 and stored in the character string information storage 3. FIG. 10 shows a schematic view of one example of character string data stored in the character string information storage 3. As seen, the character string data include a font name indicating a typeface such as Ming or Gothic, a character size, and a group of character codes, i.e. a code of the first character C1, a code of the second character C2, . . . and a code of the "n"th character Cn.

The controller 1 refers to the character string data in the character string information storage 3, reads vector font data bearing a corresponding font name from the font storage 10, and causes the display/output unit 25 to output characters as expanded or condensed to a corresponding character size. At this time, the characters are arranged in a "standard arrangement" corresponding to solid matter, i.e. with zero space reduction.

At step S3, the operator designates a desired character facing space $k_0$ through the facing space designating unit 4. The facing space $k_0$ inputted is stored in the character facing space data storage 5. It is assumed here that "30" is designated to be the character facing space $k_0$.

<Selection of Candidate Point Pairs>

A process of selecting candidate point pairs is carried out at step S1. This process will be described with reference to the flowchart of FIG. 8.

At step T1, the controller 1 reads vector font data from the font storage 10 corresponding to the character string data stored in the character string information storage 3, and the dot pattern processing unit 12 converts all of these vector font data into vector data of a designated character size, and into dot pattern data having predetermined numbers of dots. This embodiment employs a magnification of conversion at 1/10 by way of example. That is, the vector data of 100×100 size are converted into dot pattern data of 10×10 dots. In the conversion from vector data to dot pattern data, face areas in the vector data occupying, for example, 50% or more of the dot size in the dot pattern data are converted into black pixels, and others into white pixels.

At step T2, the candidate point pair storage 18 is cleared of its contents. The candidate point pair storage 18 is cleared once by way of preparation for storing information on candidate point pairs selected in the process to follow.

At step T3, the controller 1 writes dot pattern data of character Ci (reference character) and character Ci+1 (object character) stored in the dot pattern data storage 14 into the dot pattern string expansion memory 15. FIG. 11 shows a schematic view of the dot pattern string expansion memory 15. The dot pattern string expansion memory 15 has a storage space for storing dot pattern data corresponding to two characters. This storage space is divided into 10 rows (for row data) and 20 columns (for column data), 0 to 9 upward and 0 to 19 rightward, respectively, from the lower left corner of character Ci. Addresses 0–199 are assigned serially to the 200 divisions from reference character Ci to object character Ci+1. Since the converted dot pattern data have the 10×10 size, reference character Ci has addresses "0 to 99", and object character Ci+1 addresses "100 to 199".

In the following description, character Ci will be referred to also as first character C1, and character Ci+1 as second character C2. It is assumed here that the first character C1 and second character C2 have the same shapes as the characters used in the foregoing description of the overview (see FIG. 12A). The addresses occupied by the dots of the first character C1 (the region surrounded by a solid line in FIG. 12) form a set $A_0$, and this set $A_0$ ={11 to 17, 22 to 27, 33 to 37, 44 to 47, 55 to 57, 66, 67 and 77}. The addresses occupied by the dots of the second character C2 (the region surrounded by a dotted line in FIG. 12) form a set $B_0$, and this set $B_0$ ={122,123,132, 133, 142 to 146, and 152 to 156}. The subscript 0 attached to references A and B denoting the sets indicates the number of shift which is zero.

At step T4, the second character C2 is shifted toward the first character C1 by one dot. Specifically, 10 is subtracted from each address in set $B_0$ of addresses representing the dots of the second character C2. As a result, the second character C2 has a set B1 of addresses={112, 113, 122, 123, 132 to 136, and 142 to 146} (see FIG. 12B).

Step T5 is executed to check whether any dots of the two characters are present in the direction perpendicular to the direction of character arrangement, i.e. vertically aligned.

This checking is made by copying set $B_1$ to a RAM area as $B_1$', dividing all of the addresses in $B_1$' by 10, and discarding decimals from the results (hereinafter referred to as integrating). Similarly, all of the addresses in set $A_0$ are integrated. This process converts the addresses in each set into column data. Thus, the column data of set $A_0$' and set $B_1$' are compared and checked if there are the same column data. Set $A_0$'={1, 2, 3, 4, 5, 6 and 7} and set $B_1$'={11, 12, 13 and 14}, which include no same column data. Consequently, the operation returns to step T4 to make a further shift by one dot. With the dot pattern data of these two characters, steps T4 and T5 are repeated until shifts by a total of five dots are made.

Figure 13A:
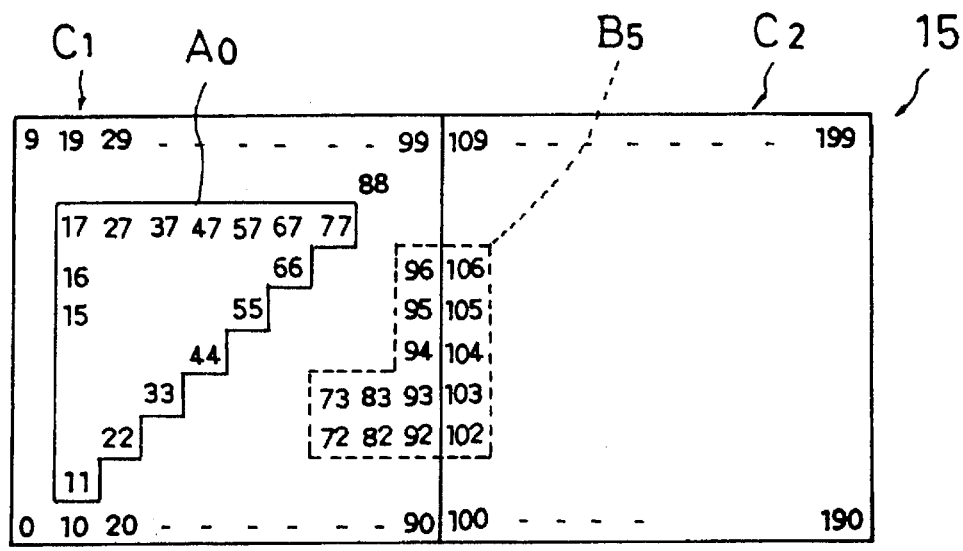
FIGS. 13A and 13B are explanatory views of candidate point pair selection.

Next, the process will be described, assuming that steps T4 and T5 indicate completion of the shifts by five dots. FIG. 13A shows a schematic view of the dot pattern string expansion memory 15 at this state.

Set $A_0$ remains{11 to 17, 22 to 27, 33 to 37, 44 to 47, 55 to 57, 66, 67 and 77} while set $B_5$={72, 73, 82, 83, 92 to 96 and 102 to 106}. Set $A_0$'={1, 2, 3, 4, 5, 6 and 7} and set $B_5$'={7, 8, 9 and 10}. Thus, set $A_0$' and set $B_5$' include the same column data "7". It is determined that the two characters have vertically aligned dots, and the operation moves from step T5 to step T6.

Step T6 is executed to set predetermined initial values to the candidate point pair auxiliary storage 16.

Figure 12A:
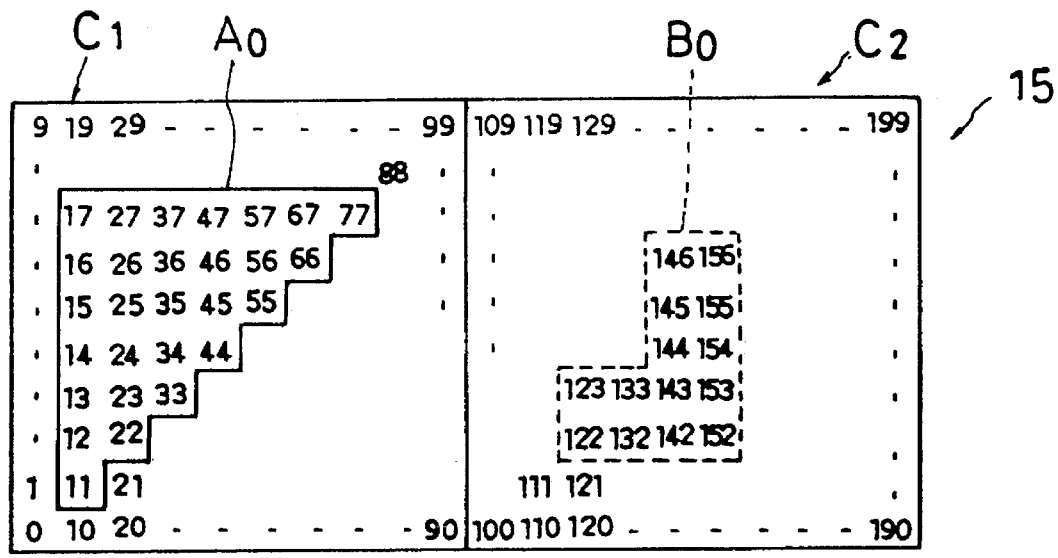
FIGS. 12A and 12B are schematic views of the dot pattern string expansion memory.
Figure 12B:
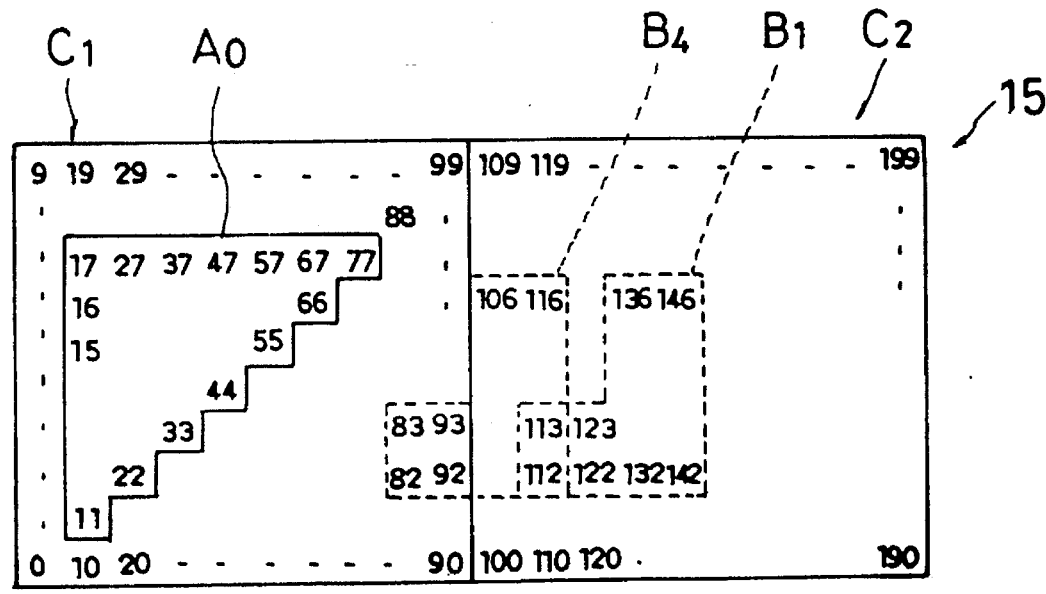
Figure 13B:

The candidate point pair auxiliary storage 16 is used to store a facing space Fp between a pair of dots having a minimum facing space in a certain column at the same shift, and original addresses thereof, i.e. the addresses Ap and Bp of the pair of dots in the "solid matter" shown in FIG. 12A. The facing space Fp stored in the candidate point pair auxiliary storage 16 is compared with a facing space between a pair of dots having a minimum facing space in a different column to the above-mentioned column at the same shift. It is therefore necessary to set some value as an initial value. In this example, "10" is set which is the largest possible facing space, and appropriate values (e.g. "0" and "0") are set as initial addresses of the candidate point pair. FIG. 13B shows schematic views of the candidate point pair auxiliary storage 16.

At step T7, all vertical aligned dot pairs are determined in reference character C1 and object character C2. At step T8, a dot pair having a minimum facing space therebetween is determined.

Currently, with the shifts made by a total of five dots, set $A_0$ of the addresses of reference character C1 ={11 to 17, 22 to 27, 33 to 37, 44 to 47, 55 to 57, 66, 67 and 77}, and set $B_5$ of the addresses of object character C2={72, 73, 82, 83, 92 to 96 and 102 to 106}. Set $A_0$' of the column data of reference character C1={1, 2, 3, 4, 5, 6 and 7}, and set $B_5$' of the column data of object character C2={7, 8, 9 and 10}. Thus, the column data sets indicate presence in column 7 of vertically aligned dots of the two characters. Then, a pair of dots are to be identified in column 7. Since the column is numbered 7, addresses of 70s are searched in the characters C1 and C2. This finds address Aw (77) in character C1 and addresses Bw (72 and 73) in character C2. The facing spaces Fp (between Aw and Bw) are found to be Fp (between 77 and 72)=5 and Fp (between 77 and 73)=4. The minimum facing space Fp (between 77 and 73)=4, and the addresses of the pair of dots, are temporarily stored in the RAM of controller 1 (step T8).

At step T11, facing space Fp between the pair of dots selected and stored in the RAM of controller 1 is compared with facing space Fp' between a pair of dots selected from a different column at the same shift and stored in the candidate point pair auxiliary storage 16. Candidate point pair information including the smaller facing space of the pair of dots and original addresses of these dots is stored in the candidate point pair auxiliary storage 16 (step T12). At this time, candidate point pair information already stored in the candidate point pair auxiliary storage 16 is deleted therefrom.

The above steps T7, T8, T11 and T12 constitute a process of selecting a pair of dots having a minimum facing space therebetween also where dot pairs are present in a plurality of columns at the same shift.

As shown in FIG. 13B, the current contents of the candidate point pair auxiliary storage 16 remain as initialized. The facing space Fp=4 stored in the controller 1 is compared with the facing space between the dot pair stored in the auxiliary storage 16. Candidate point pair information including the smaller facing space Fp=4 and original addresses Ap and Bp of these dots is stored in the candidate point pair auxiliary storage 16. The original addresses may be derived from the following equations.

$$\text{Original address Ap in character } C=Aw \quad (6)$$

$$\text{Original address Bp in character } C+1=Bw+ \text{ number of shifts}\times 10 \quad (7)$$

Thus, the current candidate point pair has original address Ap at "77" in character C1, and original address Bp at "123" (73+5×10) in character C2. Original addresses Ap at "77" and Bp at "123" are stored along with facing space Fp at "4" in the candidate point pair auxiliary storage 16 (see FIG. 13B).

Step T13 is executed to check whether the processing is completed for all of the columns having vertically aligned dots.

Currently, only column 7 includes a vertically aligned pair of dots. It is thus decided that the processing is completed for all of the columns, whereby the operation jumps to step T15.

At step T15, the facing space of the candidate point pair stored in the candidate point pair auxiliary storage 16 is compared with the facing spaces of all of the previously selected candidate point pairs stored in the candidate point pair storage 18. The current candidate point pair information is added to the candidate point pair storage 18 only when the new facing space is smaller than all of the preceding facing spaces (step T16).

As in a combination of reference character ":" and object character "–", plural pairs of dots may be selected at different shifts as a plurality of candidate point pairs. In such a case, only a candidate point pair selected at a minimum number of shifts is stored at steps T15 and T16. This feature avoids storage of an excessive number of candidate point pairs. As a result, the subsequent process may be carried out efficiently.

The candidate point pair storage 18 currently stores no candidate point pair information. The operation moves to step T16 to write the candidate point pair information (facing space Fp at "4", original address Ap at "77", and original address Bp at "123") as candidate point pair to the candidate point pair storage 18. FIG. 13B shows a schematic view of the candidate point pair storage 18 at this stage. Reference C1 in FIG. 13B indicates that the candidate point pair information relates to reference character C1 and object character C2. This candidate point pair corresponds to candidate point pair "a" in the foregoing description of the overview. Subsequently, the operation returns to step T9 in FIG. 8.

Step T9 is executed to check overlapping of the two characters, i.e. if a pair of dots overlap each other. This may be checked to see simply whether the facing space Fp is "0" or not. Since the facing space Fp is not "0", the operation returns to step T4.

Figures 14A, 14B:
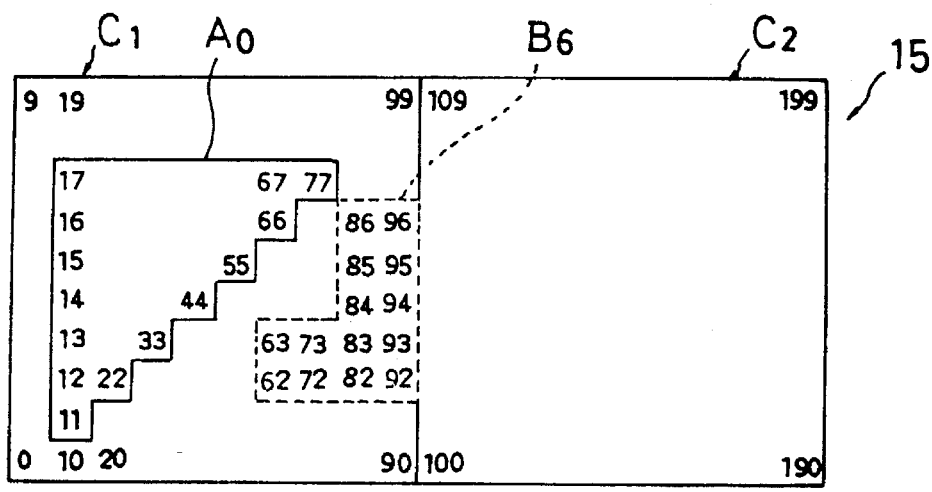
FIGS. 14A and 14B are explanatory views of candidate point pair selection.

At step T4, the object character C2 is shifted by another dot toward reference character C1 (effecting shifts by a total of six dots to a position shown in FIG. 14A). Then, set $A_0$={11 to 17, 22 to 27, 33 to 37, 44 to 47, 55 to 57, 66, 67 and 77}, set $B_6$={62, 63, 72, 73, 82 to 86 and 92 to 96}, set $A_0'$={1, 2, 3, 4, 5, 6 and 7}, and set $B_6'$={6, 7, 8 and 9}. Thus, sets $A_0'$ and $B_6'$ include the same column data "6" and "7". It is decided that vertically aligned pairs of dots are present, and the operation moves to step T6.

At step T6, as described hereinbefore, the initial values are set to the candidate point pair auxiliary storage 16 (see FIG. 14B).

With the shifts by six dots, column 6 and column 7 include dots of the two characters. Column 7 is processed first.

Addresses of 70s are searched in the characters C1 and C2. This finds address Aw (77) in character C1 and addresses Bw (72 and 73) in character C2. The facing spaces Fp (between Aw and Bw) are found to be Fp (between 77 and 72)=5 and Fp (between 77 and 73)=4. The minimum facing space Fp (between 77 and 73)=4, and the addresses of the pair of dots, are temporarily stored in the RAM of controller 1 (step T8).

At steps T11 and T12, candidate point pair information including the facing space Fp at "4" stored in the controller 1, and original addresses Ap at "77" and Bp at "133" (73+6×10) of the pair of dots derived from foregoing equations (6) and (7), is stored in the candidate point pair auxiliary storage 16 (see FIG. 14B).

Step T13 is executed to check whether the processing is completed for all of the columns having vertically aligned dots. At this stage, the processing is completed only for column 7 of the two columns. Thus, the operation moves from step T13 to step T7.

Step T7 is executed to process column 6.

Addresses of 60s are searched in character C1 and character C2. This finds addresses Aw (66 and 67) in character C1 and addresses Bw (62 and 63) in character C2. The facing spaces Fp (between Aw and Bw) are found to be Fp (between 67 and 62)=5, Fp (between 67 and 63)=4, Fp (between 66 and 62)=4, and Fp (between 66 and 63)=3. The minimum facing space Fp (between 66 and 63)=3, and the addresses of the pair of dots, are temporarily stored in the RAM of controller 1 (step T8).

At steps T11 and T12 in FIG. 9, candidate point pair information including the facing space Fp at "3" stored in the RAM of controller 1, and original addresses Ap at "66" and Bp at "123" (63+6×10) of the pair of dots, is stored in the candidate point pair auxiliary storage 16 (see FIG. 14B).

It is determined at Step T13 that the processing is completed for all of the columns having vertically aligned dots. Then, steps T15 and T16 are executed to write the candidate point pair information (facing space Fp at "3", original address Ap at "66", and original address Bp at "123") as candidate point pair to the candidate point pair storage 18 (see FIG. 14B). This candidate point pair corresponds to candidate point pair "b" in the foregoing description of the overview.

Figure 15A:
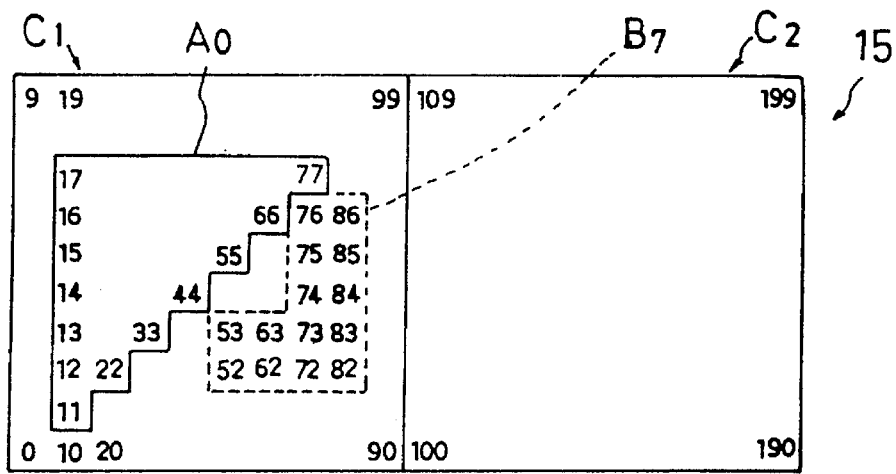
FIGS. 15A and 15B are explanatory views of candidate point pair selection.
Figure 15B:

For shifts by a total of seven dots (see FIG. 15A), steps T4 through T16 are executed, as described above, to determine that set $A_0$ of the addresses of character C1={11 to 17, 22 to 27, 33 to 37, 44 to 47, 55 to 57, 66, 67 and 77}, and set $B_7$ of the addresses of character C2={52, 53, 62, 63, 72 to 76 and 82 to 86}. Set $A_0'$ of the column data of character C1={1, 2, 3, 4, 5, 6 and 7}, and set $B_7'$ of the column data of character C2={5, 6, 7 and 8}. Thus, the same column data "5", "6" and "7" are included. The following data will be stored in relation to the respective columns (see FIGS. 15A and 15B):

[Column 7]

In RAM of controller 1 . . . Fp (77, 76)=1, Aw=77 and Bw=76

At step 12, these data are stored as candidate point pair information in the candidate point pair auxiliary storage 16.

[Column 6]

In RAM of controller 1 . . . Fp (66, 63)=3, Aw=66 and Bw=63

As a result of the comparison made at step T11, this facing space is found larger than that of column 7, and therefore these data are not stored in the candidate point pair auxiliary storage 16. The contents of the candidate point pair auxiliary storage 16 remain those of column 7.

[Column 5]

In RA of controller 1 . . . Fp (55, 53)=2, Aw=55 and Bw=53

These data are not stored in the candidate point pair auxiliary storage 16, either. The contents of the candidate point pair auxiliary storage 16 remain those of column 7.

Consequently, at steps T15 and T16, the candidate point pair information (Fp (77, 76)=1, Ap=77 and Bp =146) is added as candidate point pair to the candidate point pair storage 18. This candidate point pair corresponds to candidate point pair "c" in the foregoing description of the overview.

Figure 16A:
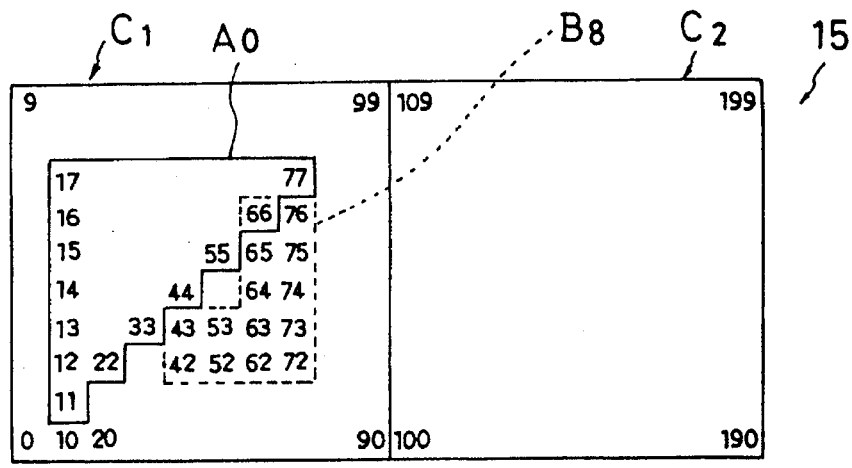
FIGS. 16A and 16B are explanatory views of candidate point pair selection.
Figure 16B:
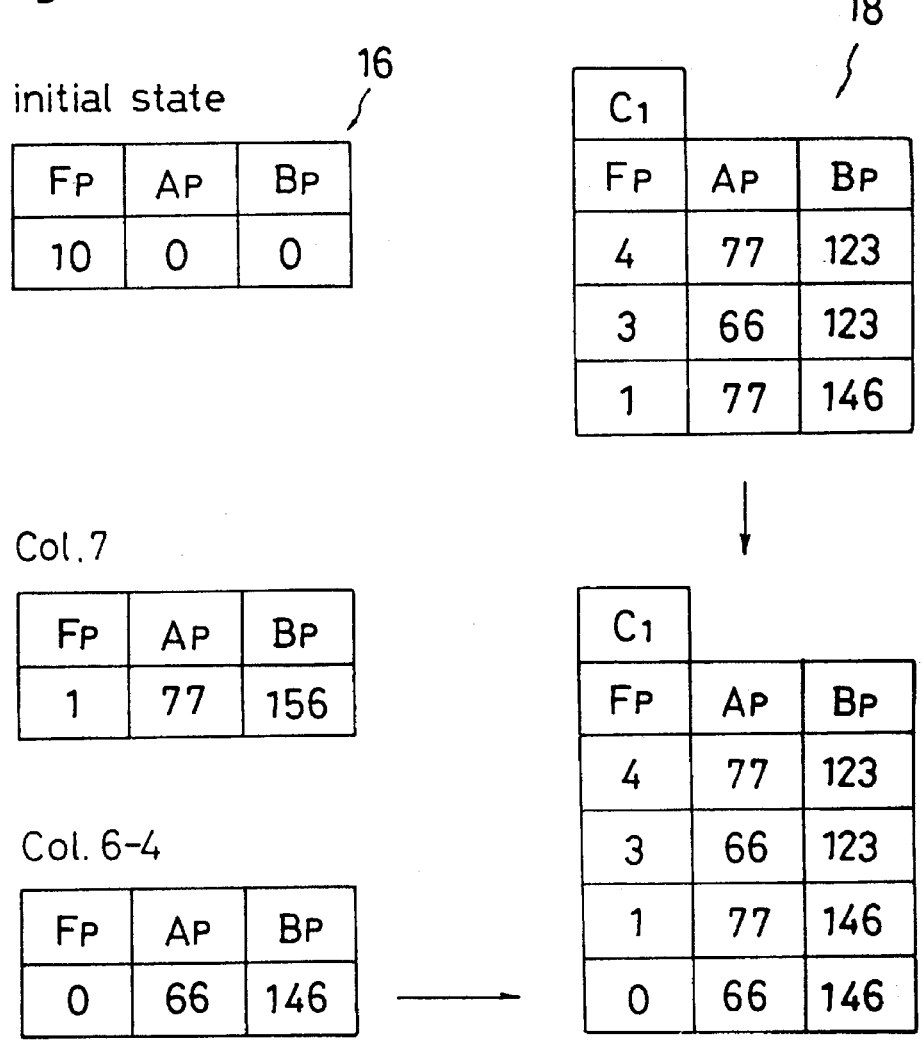

Next, for shifts by a total of eight dots (see FIG. 16A), steps T4 through T16 are executed to determine that, since set $A_0$ of the addresses of character C1={11 to 17, 22 to 27, 33 to 37, 44 to 47, 55 to 57, 66, 67 and 77}, dots of the two dot patterns are included in columns "4", "5", "6" and "7". The following data will be stored in relation to the respective columns (see FIGS. 16A and 16B):

[Column 7]

In RAM of controller 1 . . . Fp (77, 76)=1, Aw=77 and Bw=76

At step T12, these data are stored as candidate point pair information in the candidate point pair auxiliary storage 16.

[Column 6]

In RAM of controller 1 . . . Fp (66, 66)=0, Aw=66 and Bw=66

At step T12, these data are stored as candidate point pair information in the candidate point pair auxiliary storage 16.

[Column 5]

In RAM of controller 1 . . . Fp (55, 53)=2, Aw=55 and Bw=53

As a result of the comparison made at step T11, this facing space is found larger than that of column 6, and therefore these data are not stored in the candidate point pair auxiliary storage 16. The contents of the candidate point pair auxiliary storage 16 remain those of column 6.

[Column 4]

In RAM of controller 1 . . . Fp (44, 43)=1, Aw=44 and Bw=43

These data are not stored in the candidate point pair auxiliary storage 16, either. The contents of the candidate point pair auxiliary storage 16 remain those of column 6.

Consequently, at steps T15 and T16, the candidate point pair information (Fp (66, 66)=0, Ap=66 and Bp =146) is added as candidate point pair to the candidate point pair storage 18. This candidate point pair corresponds to candidate point pair "d" in the foregoing description of the overview.

With these data, the checking made at Step T9 determines that the two characters overlap each other since the facing space Fp is "0". Then, the operation moves to step T10 for processing a next combination of characters. The selection and storage of the candidate point pairs are terminated for the two characters also when shifts have been made by 10 dots without overlapping of the two characters, to move to the next process.

A similar process is carried out for the next combination of character C2 and character C3. When all characters (Cn−1 and Cn) have been processed, the operation returns from step T10 to the main routine in FIG. 7. FIG. 17 shows a schematic view of the candidate point pair storage 18 at a stage of completion of the processing for all characters, i.e. up to the combination of characters Cn−1 and Cn.

<Computation of Space Reductions>

Figure 18:
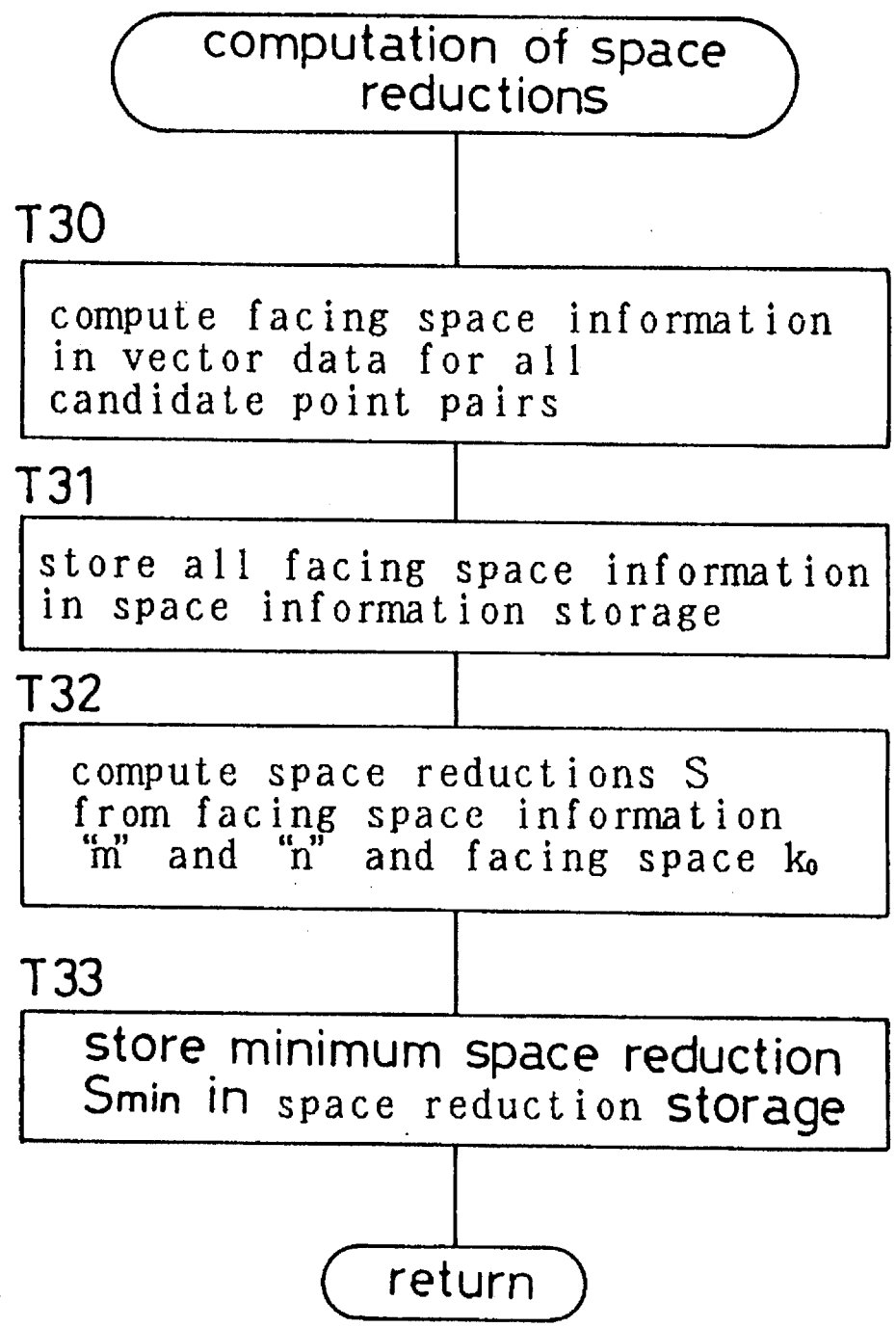
FIG. 18 is a flowchart of a process of computing space reductions.

At step 4, an amount of space reduction is computed from the candidate point pair information derived from step 3 to determine how much the object character should be kerned relative to the reference character from the state of solid matter. This computation process will be described with reference to the flowchart shown in FIG. 18.

At step T30, facing space information "m" in the shifting direction and facing space information "n" in the direction perpendicular thereto, which correspond to spacing between candidate point pairs in the vector data, are derived from the original addresses in the respective candidate point pair information of all the characters selected and stored in the candidate point pair storage 18.

Specifically, the facing space information "m" in the shifting direction and facing space information "n" in the direction perpendicular thereto of the respective candidate point pairs are obtained as follows.

The facing space information "m" in the shifting direction is obtained as follows.

First, original addresses Ap and Bp are converted into column data and a difference therebetween is determined, which determines facing space in the shifting direction from the dot center. Then, one dot is subtracted from the difference in order to obtain facing space in terms of dot contour. Further, since the dot pattern data have been converted in the magnification ratio of 1/10, the result is multiplied by the inverse of the magnification ratio to reinstate the dot pattern data. This may be expressed as follows. In the following expression, the division sign "/" indicates integrating.

$$m=\{(Bp/10-Ap/10)-1\}\times 10 \qquad (8)$$

The facing space information "n" in the direction perpendicular to the shifting direction is obtained as follows.

First, original addresses Ap and Bp are converted into row data and a difference therebetween is determined, which determines facing space from the dot center in the direction perpendicular to the shifting direction. This facing space can be negative, depending on a combination of character faces, and therefore takes an absolute value. Then, one dot is subtracted from the difference in order to obtain facing space in terms of dot contour. The result is multiplied by the inverse of the magnification ratio. This may be expressed as follows (but n=0 when Fp=0).

$$n=\{|[Bp-(Bp/10)\times 10]-[ap-(Ap/10)\times 10]|-1\}\times 10 \qquad (9)$$

From equations (8) and (9) above and the candidate point pair information of reference character C1 and object character C2 acquired from the above process (assuming facing space Fp (Ap, Bp), Fp (77, 123)=4, Fp (66, 123)=3, Fp (77, 146)=1 and Fp (66, 146)=0; see FIG. 17), we obtain:

for candidate point pair "a", m= 40 and n= 30;

for candidate point pair "b", m= 50 and n= 20;

for candidate point pair "c", m= 60 and n= 0; and for candidate point pair "d", m=70 and n=0.

Step T31 is executed to store facing space information "m" and "n" computed for each character at step T30, in the facing space information storage 20. FIG. 19 shows the contents of facing space information storage 20 at this stage.

At step T32, the space reduction computing unit 22 computes space reductions S from the facing space information "m" and "n" and facing spaces $k_0$ of all the characters. Specifically, the space reductions are derived from all the candidate point pairs for each character, using equation (5) shown in the description of the overview.

Assuming, for example, that facing space $k_0=30$, the following space reductions Sa, Sb, Sc and Sd are obtained for the respective candidate point pairs in reference character C1 and object character C2:

| | |
|---|---|
| space reduction $S_a = 40 \pm 0$ | ∴ space reduction $S_a = 40$ |
| space reduction $S_b = 50 \pm \sqrt{500}$ | ∴ space reduction $S_b = 28, 72$ |
| space reduction $S_c = 60 \pm 30$ | ∴ space reduction $S_c = 30, 90$ |
| space reduction $S_d = 70 \pm 30$ | ∴ space reduction $S_d = 40, 100$ |

Figure 20:
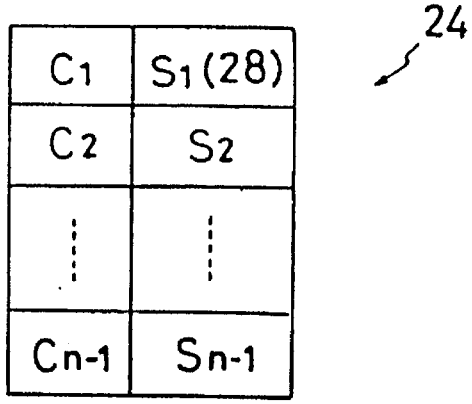
FIG. 20 is a schematic view of a space reduction storage after all the characters are processed.

At step T33, a minimum space reduction Smin among the space reductions S computed for each character at step S32 is determined for each character and stored in the space reduction storage 24. In the above example, space reduction Sb=28 derived from candidate point pair "b" is the minimum, and thus minimum space reduction Smin=S1=28 is stored in the space reduction storage 24 as a space reduction amount for reference character C1 and object character C2. FIG. 20 shows a schematic view of the space reduction storage 24 at this state.

Then, the operation returns to the main routine in FIG. 7, and step S5 is executed.

At step S5, the controller 1 reads, from the font storage 10, vector font data corresponding to the character string data in the character string information storage 3, and outputs the vector font data to the display/output unit 25. At this time, the controller 1 refers to the space reduction storage 24 and causes the characters to be displayed with object character Ci+1 kerned relative to reference character Ci by a corresponding space reduction Si.

At step S6, the operator looks at the character string displayed at step S5, and determines whether character spacing has been adjusted in a satisfactory manner or not. If the spacing adjustment is unacceptable, the operator designates facing space $k_0$ again at step S7. Then, step S4 is executed without returning to step S3 for selecting candidate point pairs. This expedites the processing, and renders the processing suited to fine adjustments of facing space which involve repeated setting of facing space.

Figure 21:
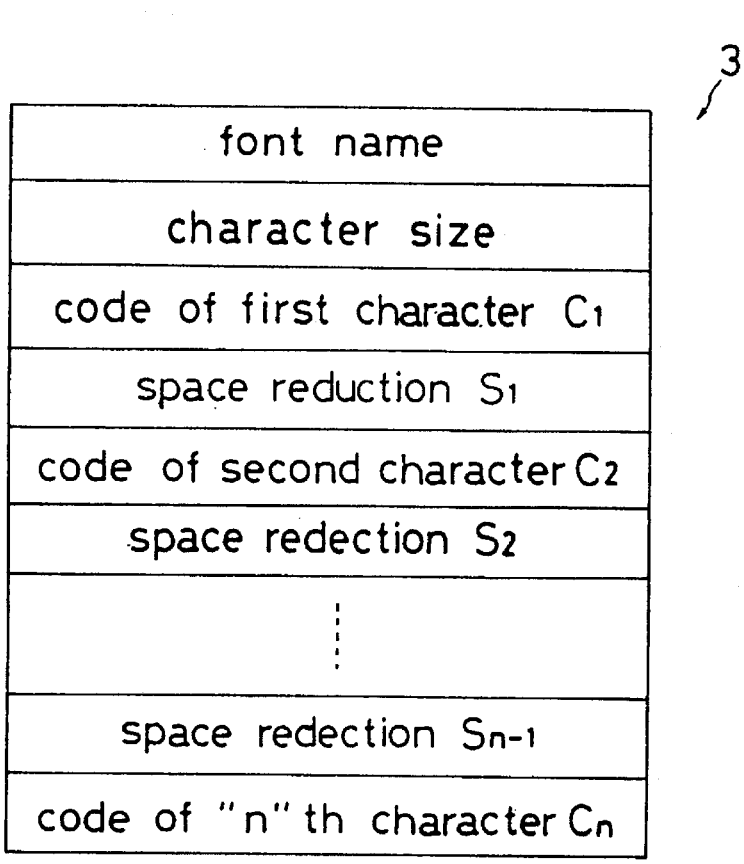
FIG. 21 is a schematic view of a character string information storage after all the characters are processed.

If it is decided at step S6 that the adjustments of character spacing are satisfactory, the operation moves to step S8 to write space reductions S1 to Sn−1 for the respective characters stored in the space reduction storage 24, to the character string information storage 3 as added to the character codes. FIG. 21 shows a schematic view of the character string information storage 3 with the space reductions added thereto.

The above completes the kerning process. After the kerning process, the operator may instruct copying of the character string data from the character string information storage 3 to a separate medium, or output of the character string to a printer or other output device in the display/output unit 25.

In this embodiment, the vector data are converted into dot pattern data of 10×10 dots. This is not limitative, but the vector data may be converted into dot patterns of any number (N×N) of dots. A large number of dots require an extended processing time but achieve facing space with increased precision. A small number of dots cannot achieve precise facing space but allow a short processing time. Thus, the number of dots may be determined in view of processing time and precision of facing space adjustment.

In the conversion from vector data to dot pattern data, the character faces in the vector data are all converted into dot patterns. However, only the face contours in the vector data may be converted into dot patterns. This may reduce the number of vertically aligned pairs to enhance the efficiency of candidate point pair selection.

In the foregoing embodiment, the vector data are converted into dot pattern data having appropriate numbers of dots, candidate point pairs are selected, and then the vector data are displayed with computed space reductions. Alternatively, candidate point pairs may be selected after converting the vector data into dot pattern data having the numbers of dots in which the data are displayed on or outputted from the display/output unit 25. Thus, the dot pattern data as they are are displayed on or outputted from the display/output unit 25. This expedites the process by the time required to read the vector font data from the font storage 10 and convert these data into dot pattern data. Conversely, where dot pattern data are made available for display purposes, then these data may be used in the process.

In the foregoing embodiment, a pair of dots having a minimum facing space therebetween at each shift is selected as a candidate point pair for that shift. Those point pairs having larger facing spaces than a designated facing space may be excluded from the candidate point pairs. This is because the candidate point pairs having larger facing spaces than a designated facing space, whatever amounts they may be kerned, never attain a two-dimensional facing space matching the facing space. Their exclusion lightens the load of computation of space reductions.

As exemplified hereinbefore, the present invention can equally handle both ordinary kerning and kerning tending to involve in-thrusting (in which two characters, such as "T" and "J", thrust into each other, instead of overlapping their faces), and allows kerning of different size characters.

The present invention may be embodied in other specific forms without departing from the spirit or essential attributes thereof and, accordingly, reference should be made to the appended claims, rather than to the foregoing specification, as indicating the scope of the invention.

What is claimed is:

1. A kerning method for adjusting a position of an object character relative to an adjacent reference character already fixed in place, in arranging characters of a character string in a predetermined direction based on rectangular character frames including character patterns therein, said method comprising the steps of:

(a) designating a minimum two-dimensional space between the faces of said reference character and said object character;

(b) shifting a dot pattern of the face of said object character dot by dot toward a dot pattern of the face of said reference character, and determining, at respective shifts, pairs of dots providing minimum facing space between said dot patterns in a direction perpendicular to a shifting direction;

(c) storing facing space information in said shifting direction and facing space information in said direction perpendicular thereto of said candidate point pairs when the imaginary bodies of said reference character and said object character contact each other;

(d) moving said object character toward said reference character from a position in which said imaginary bodies contact each other, based on said facing space information in said shifting direction and said facing space information in said direction perpendicular thereto of said candidate point pairs and said facing space designated, and computing space reductions for the respective candidate point pairs until the facing space between said candidate point pairs agrees with said facing space designated;

(e) determining a space reduction providing a minimum facing space among said space reductions computed; and (f) positioning said object character relative to said reference character with said minimum facing space therebetween.

2. A method as defined in claim 1, wherein, at step (b), a pair of dots having a minimum facing space therebetween are selected as a candidate point pair when dot pairs are aligned in a plurality of columns in said direction perpendicular to said shifting directions, at each shift of said dot pattern of said object character toward said dot pattern of said reference character.

3. A method as defined in claim 1, wherein, at step (b), a pair of dots having a minimum facing space between said dot patterns in said direction perpendicular to said shifting direction is determined at each shift of said dot pattern of said object character toward said dot pattern of said reference character, step (b) being completed by selecting, as a candidate point pair, a dot pair through which said dot patterns overlap each other after the shift.

4. A method as defined in claim 1, wherein, at step (b), a pair of dots are selected as a candidate point pair when a plurality of dot pairs having a minimum facing space are aligned in one column in said direction perpendicular to said shifting direction, at each shift of said dot pattern of said object character toward said dot pattern of said reference character.

5. A method as defined in claim 1, wherein, at step (b), a candidate point pair is selected at a large shift only when this candidate point pair provides a smaller facing space than the facing space at a candidate point pair at a smaller shift.

6. A typographic apparatus utilizing a kerning method for adjusting a position of an object character relative to an adjacent reference character already fixed in place, in arranging characters of a character string in a predetermined direction based on rectangular character frames including character patters therein, said apparatus comprising:

(a) facing space designating means for designating a minimum two-dimensional space between the faces of said reference character and said object character;

(b) dot pattern processing means for converting the faces of said object character and said reference character into dot pattern data having a predetermined number of dots;

(c) a dot pattern data storage for storing said dot pattern data of said object character and said reference character;

(d) a dot pattern string expansion memory for storing said dot pattern data of said object character and said reference character stored in said dot pattern data storage;

(e) candidate point pair computing means for shifting said dot pattern of said object character dot by dot toward said dot pattern of said reference character stored in said dot pattern string expansion memory, and determining, at respective shifts, pairs of dots providing minimum facing space between said dot patterns in a direction perpendicular to a shifting direction;

(f) a candidate point pair storage for storing said candidate point pairs computed by said candidate point pair computing means;

(g) a facing space information storage for storing facing space information in said shifting direction and facing space information in said direction perpendicular thereto of said candidate point pairs when the imaginary bodies of said reference character and said object character contact each other;

(h) space reduction computing means for moving said object character toward said reference character from a position in which said imaginary bodies contact each other, based on said facing space information in said shifting direction and said facing space information in said direction perpendicular thereto of said candidate point pairs and said facing space designated, and computing space reductions for the respective candidate point pairs until the facing space between said candidate point pairs agrees with said facing space designated;

(i) a space reduction storage for storing a space reduction providing a minimum facing space among said space reductions computed; and (j) position control means for positioning said object character relative to said reference character with said minimum facing space in said space reduction storage.

7. An apparatus as defined in claim 6, wherein said candidate point pair computing means is operable to select a pair of dots having a minimum facing space therebetween as a candidate point pair when dot pairs are aligned in a plurality of columns in said direction perpendicular to said shifting direction, at each shift of said dot pattern of said object character toward said dot pattern of said reference character.

8. An apparatus as defined in claim 6, wherein said candidate point pair computing means is operable to determine a pair of dots having a minimum facing space between said dot patterns in said direction perpendicular to said shifting direction, at each shift of said dot pattern of said object character toward said dot pattern of said reference character, and to complete candidate point pair computation by selecting, as a candidate point pair, a dot pair with which said dot patterns overlap each other after the shift.

9. An apparatus as defined in claim 6, wherein said candidate point pair computing means is operable to select a pair of dots as a candidate point pair when a plurality of dot pairs having a minimum facing space are aligned in one column in said direction perpendicular to said shifting direction, at each shift of said dot pattern of said object character toward said dot pattern of said reference character.

10. An apparatus as defined in claim 6, wherein said candidate point pair computing means is operable to select a candidate point pair at a large shift only when this candidate point pair provides a smaller facing space than the facing space at a candidate point pair at a smaller shift.

* * * * *